United States Patent
Rudisill et al.

(10) Patent No.: US 11,173,698 B2
(45) Date of Patent: Nov. 16, 2021

(54) COSMETIC AGENT FOR THREE-DIMENSIONAL PRINTING

(71) Applicant: HEWLETT-PACKARD DEVELOPMENT COMPANY, L.P., Spring, TX (US)

(72) Inventors: Stephen G Rudisill, San Diego, CA (US); Jacob Tyler Wright, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 93 days.

(21) Appl. No.: 16/635,038

(22) PCT Filed: Oct. 12, 2017

(86) PCT No.: PCT/US2017/056339
§ 371 (c)(1),
(2) Date: Jan. 29, 2020

(87) PCT Pub. No.: WO2019/074508
PCT Pub. Date: Apr. 18, 2019

(65) Prior Publication Data
US 2020/0247108 A1     Aug. 6, 2020

(51) Int. Cl.
| | |
|---|---|
| *B29C 64/165* | (2017.01) |
| *B33Y 30/00* | (2015.01) |
| *B33Y 70/00* | (2020.01) |
| *B33Y 80/00* | (2015.01) |
| *B29C 64/153* | (2017.01) |
| *B29C 64/393* | (2017.01) |
| *B29K 77/00* | (2006.01) |
| *B29K 101/12* | (2006.01) |
| *B29L 31/00* | (2006.01) |

(Continued)

(52) U.S. Cl.
CPC ............ *B33Y 10/00* (2014.12); *B29C 64/165* (2017.08); *B22F 10/10* (2021.01); *B29C 64/153* (2017.08); *B29C 64/393* (2017.08); *B29K 2077/00* (2013.01); *B29K 2101/12* (2013.01); *B29L 2031/718* (2013.01); *B33Y 30/00* (2014.12); *B33Y 70/00* (2014.12); *B33Y 80/00* (2014.12)

(58) Field of Classification Search
CPC ... B29C 64/153; B29C 64/165; B29C 64/393; B33Y 10/00; B33Y 80/00; B33Y 30/00; B22F 10/00
See application file for complete search history.

(56) References Cited

U.S. PATENT DOCUMENTS

| | | | |
|---|---|---|---|
| 2014/0065378 A1 | 3/2014 | Xu | |
| 2014/0196223 A1* | 7/2014 | Yabuki | ...................... D06P 5/30 8/499 |

(Continued)

FOREIGN PATENT DOCUMENTS

| | | |
|---|---|---|
| CN | 102977637 B | 3/2013 |
| DE | 19938463 A1 | 2/2001 |

(Continued)

*Primary Examiner* — Nahida Sultana
(74) *Attorney, Agent, or Firm* — Dierker & Kavanaugh PC

(57) ABSTRACT

Examples of a cosmetic agent are for three-dimensional (3D) printing. In an example, the cosmetic agent includes a dye, an oxidizing agent, and a solvent. The oxidizing agent is to react with an antioxidant in a build material to reduce reduction of the dye in the presence of the antioxidant.

15 Claims, 5 Drawing Sheets

(51) Int. Cl.
*B22F 10/10* (2021.01)
*B33Y 10/00* (2015.01)

(56) References Cited

U.S. PATENT DOCUMENTS

| | | | |
|---|---|---|---|
| 2015/0037546 A1* | 2/2015 | Yagi | B41J 2/01 |
| | | | 428/196 |
| 2017/0066936 A1 | 3/2017 | Lee et al. | |
| 2017/0232675 A1 | 8/2017 | Jaunet | |

FOREIGN PATENT DOCUMENTS

| | | |
|---|---|---|
| WO | WO-2015028499 A1 | 3/2015 |
| WO | WO-2016171724 A1 | 10/2016 |
| WO | WO-2017062031 A1 | 4/2017 |

* cited by examiner

COSMETIC AGENT FOR THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing or fusing or melting of the build material. For some materials, at least partial melting may be accomplished using heat-assisted extrusion, and for some other materials (e.g., polymerizable materials), curing or fusing may be accomplished using, for example, ultraviolet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
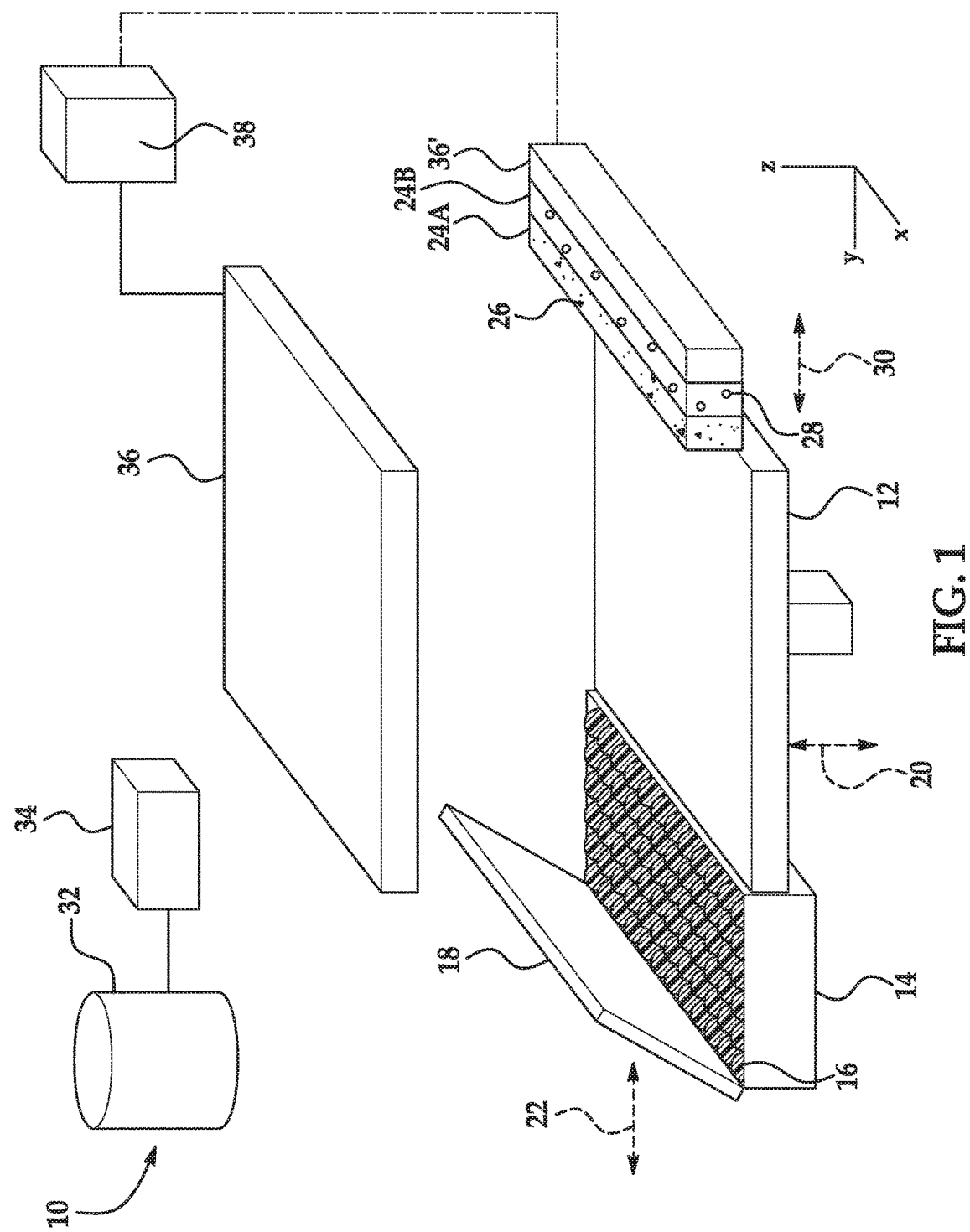
FIG. 1 is a simplified isometric and schematic view of an example of a 3D printing system disclosed herein.

Examples of the three-dimensional (3D) printing method and the 3D printing system disclosed herein may utilize a fusing agent. In these examples, an entire layer of a build material (also referred to as build material particles) is exposed to radiation, but a selected region (in some instances less than the entire layer) of the build material is fused and hardened to become a layer of a 3D part. The fusing agent is selectively deposited in contact with the selected region of the build material. The fusing agent(s) is capable of at least partially penetrating into the layer of the build material and spreading onto the exterior surface of the build material. This fusing agent is capable of absorbing radiation and converting the absorbed radiation to thermal energy, which in turn fuses the build material that is in contact with the fusing agent. This causes the build material to at least partially melt, bind, cure, etc. to form the layer of the 3D part.

Build materials (e.g., polymeric or polymeric composite build materials) containing antioxidants have been used to form 3D parts in this manner. The antioxidants may prevent or slow molecular weight decreases of the build material and/or may prevent or slow discoloration (e.g., yellowing) of the build material by preventing or slowing oxidation of the build material.

However, it has been discovered that, when the build material contains antioxidants, the antioxidants may degrade a dye of a cosmetic agent applied to the build material. The cosmetic agent may be used to impart a desired or intended color to the formed 3D part. The antioxidants may degrade the dye by causing its reduction, which may cause the dye to change color. For example, a black dye, when reduced by an antioxidant, may turn brown. When the antioxidants degrade the dye, the dye may cause the formed 3D part to exhibit the degraded color (e.g., brown), rather than the desired or intended color (e.g., black).

In some examples disclosed herein, an oxidizing agent is included in the cosmetic agent. In other examples disclosed herein, an oxidizing fluid, which includes the oxidizing agent, is used in combination with another example of the cosmetic agent (which does not include the oxidizing agent). The cosmetic agent (including the oxidizing agent) or the oxidizing fluid in combination with the cosmetic agent (not including the oxidizing agent) may be selectively applied to a build material including the antioxidant(s). The antioxidant(s) in the build material preferentially react with the applied oxidizing agent, rather than the dye. When applied, the oxidizing agent may react with the antioxidant(s), which at least reduces the reduction of the dye by the antioxidant(s). It is believed that the addition of the oxidizing agent competitively inhibits the reduction of the dye. The unreduced dye maintains its color, and thus the formed 3D part exhibits the desired or intended color.

In some examples, the cosmetic agent, for three-dimensional (3D) printing, comprises a dye; an oxidizing agent to react with an antioxidant in a build material to reduce reduction of the dye in the presence of the antioxidant; and a solvent. In these examples, the dye exhibits a color, and maintains the color in the presence of the build material. In these examples, the cosmetic agent may include additional components. Examples of additional components that may be included in the cosmetic agent include a co-solvent and an additive selected from the group consisting of a surfactant, an antimicrobial agent, an anti-kogation agent, a chelating agent, a buffer, and combinations thereof.

In other examples, the cosmetic agent consists of: the dye; the oxidizing agent to react with the antioxidant in the build material to reduce reduction of the dye in the presence of the antioxidant; and the solvent. In these examples, the cosmetic agent includes no other components.

In still other examples, the cosmetic agent consists of: the dye; the oxidizing agent to react with the antioxidant in the build material to reduce reduction of the dye in the presence of the antioxidant; the solvent; the co-solvent; and the additive selected from the group consisting of the surfactant, the antimicrobial agent, the anti-kogation agent, the chelating agent, the buffer, and combinations thereof. In these examples, the cosmetic agent includes no other components.

In some examples, the cosmetic agent includes the oxidizing agent. These examples of the cosmetic agent may be used without the oxidizing fluid. As mentioned above, the oxidizing agent at least substantially prevents the antioxidant(s), in the build material to which the cosmetic agent is applied, from reducing the dye and degrading its color by reacting with the antioxidant(s).

In an example, oxidizing agent is selected from the group consisting of inorganic nitrates, peroxides, persulfates, permanganates, nitric acid, hypochlorites, chlorites, chlorates, perchlorates, sulfuric acid, iodates, and combinations thereof. Examples of suitable inorganic nitrates include potassium nitrate, aluminum nitrate, magnesium nitrate, potassium nitrate, silver nitrate, sodium nitrate, strontium nitrate, etc. Examples of suitable peroxides include hydroperoxides, inorganic peroxides, and ketone peroxides. Specific examples of peroxides include benzoyl peroxide, hydrogen peroxide, barium peroxide, strontium peroxide, zinc peroxide, sodium peroxide, etc. Examples of suitable persulfates include potassium persulfate, ammonium persulfate, sodium persulfate, etc. Examples of suitable permanganates include potassium permanganate, sodium permanganate, ammonium permanganate, etc. Examples of suitable hypochlorites include sodium hypochlorite, calcium hypochlorite, etc. An example of a suitable chlorite includes sodium chlorite. Examples of suitable chlorates include calcium chlorate, potassium chlorate, sodium chlorate, etc. Examples of suitable perchlorates include magnesium perchlorate, sodium perchlorate, ammonium perchlorate, etc. Examples of suitable iodates include calcium iodate, potassium iodate, sodium iodate, etc. In another example, the oxidizing agent may be bromine, a bromate (e.g., potassium bromate, etc.), a chlorinated isocyanurate, a chromate, a dichromate (e.g., potassium dichromate, sodium dichromate, ammonium dichromate, etc.), a nitrite (e.g., sodium nitrite, etc.), a perborate (e.g., sodium perborate, etc.), perchloric acid, a periodate, a peroxyacid, or a combination thereof. In still another example, the oxidizing agent may be sodium dichloroisocyanurate dehydrate, trichloroisocyanuric acid, chromic acid, 1,3-dichloro-5,5-dimethylhydantoin, potassium dichloroisocyanurate, sodium dichloroisocyanurate, tetranitromethane, or a combination thereof. In yet another example, the oxidizing agent may be a stable radical (e.g., (2,2,6,6-Tetramethylpiperidin-1-yl)oxyl (TEMPO)), a radical initiator compound (e.g., azobisisobutyronitrile (AIBN), 2,2'-azobis(2-methylpropionamidine), etc.) or a combination thereof. While several examples have been provided herein, it is contemplated that other oxidizing agents may also be used.

If an insufficient amount of the oxidizing agent is present in the cosmetic agent, the oxidizing agent may be unable to react with enough of the antioxidant in the portion of the build material to which the cosmetic agent is applied, and the unreacted antioxidant may reduce and discolor the dye. If too much of the oxidizing agent is present in the cosmetic agent, the excess oxidizing agent may cause the 3D part to turn grey. In an example, the oxidizing agent is present in the cosmetic agent in an amount sufficient to react with the antioxidant(s) in the portion of the build material to which the cosmetic agent is applied. In this example, after the oxidizing agent reacts with the antioxidant(s), the portion of the build material to which the cosmetic agent may contain no unreacted antioxidant(s). An example of the sufficient amount of the oxidizing agent ranges from about 0.5 wt % to about 10 wt % based on the total weight of the cosmetic agent. Another example of the sufficient amount of the oxidizing agent ranges from about 1 wt % to about 5 wt % based on the total weight of the cosmetic agent. In another example, the oxidizing agent is present in an amount ranging from about 2 wt % to about 5 wt % based on the total weight of the cosmetic agent. In yet another example, the amount of the oxidizing agent present in the cosmetic agent is about 3 wt % based on the total weight of the cosmetic agent.

As mentioned above, the cosmetic agent also includes the dye. The dye exhibits a color. The dye becomes embedded in the region(s) of the 3D part to which the cosmetic agent is applied and causes that/those region(s) to be colored region(s) and to exhibit the color of the dye. The dye is reducible in the presence of the antioxidant(s) contained in the build material. In some examples, the color of the reduced dye may be different than the color of the unreduced dye. In the examples disclosed herein, the dye applied to the build material maintains the color it exhibits in its unreduced form, because the oxidizing agent reacts with the antioxidant(s) and at least substantially prevents reduction of the dye.

In an example, the dye is water-soluble. In another example, the dye is selected from the group consisting of Direct Black 168, Pacified Reactive Black 31, Acid Black 1, Food Black 2, and combinations thereof. In still another example, the dye may be an azo dye (e.g., Pro-Jet™ Fast Black 1 or Pro-Jet™ Fast Black 2 available from Fuji Film Industrial Colorants). In still another example, the dye is JPD Black H-BKD (Nippon Kayaku).

In an example, the dye is present in an amount ranging from about 0.5 wt % to about 5 wt % based on the total weight of the cosmetic agent. In another example, the dye is present in an amount ranging from about 1 wt % to about 5 wt % based on the total weight of the cosmetic agent. In still another example, the amount of the dye present in the cosmetic agent is about 3 wt % based on the total weight of the cosmetic agent. It is believed that these dye loadings provide a balance between the cosmetic agent having jetting reliability and efficiency in imparting color.

The solvent of the cosmetic agent may be water or a non-aqueous solvent. As an example, deionized water may be used. In some examples, the solvent is used alone (i.e., without any co-solvents). In these examples, the weight percent of the solvent is 100% minus the wt % of the dye and the wt % of the oxidizing agent, and the wt % of any additives (when included).

In other examples, whether the solvent is water or the non-aqueous solvent, the cosmetic agent may also include a co-solvent.

Examples of suitable solvents and/or suitable co-solvents that may be included in the cosmetic agent include 1,6-hexanediol or other diols (e.g., 1,5-pentanediol, 2-methyl-1,3-propanediol, etc.), dimethyl sulfoxide (DMSO), isopropyl alcohol, ethanol, pentanol, acetone, glycerol, triethylene glycol, tetraethylene glycol, dipropylene glycol, tripropylene glycol methyl ether, or the like, and combinations thereof. In some examples, the solvent or the co-solvent may include a humectant. Examples of suitable humectants include 1-methyl-2-pyrrolidone, 1-(2-hydroxyethyl)-2-pyrrolidone, 2-pyrrolidinone (i.e., 2-pyrrolidone), and combinations thereof.

In an example, the solvent and/or the co-solvent is/are present in a total amount ranging from about 5 wt % to about 70 wt % based on the total weight of the cosmetic agent. In another example, the solvent and/or the co-solvent is present in a total amount ranging from about 8 wt % to about 60 wt % based on the total weight of the cosmetic agent. In still another example, the total amount of the solvent and/or the co-solvent(s) present in the cosmetic agent is about 45 wt % based on the total weight of the cosmetic agent.

The solvent and/or the co-solvent(s) of the cosmetic agent may depend, in part upon the jetting technology that is to be used to dispense the cosmetic agent. For example, if thermal inkjet is to be used, water and/or ethanol and/or other longer chain alcohols (e.g., pentanol) may be the solvent or co-solvents, which make up 35 wt % or more of the cosmetic agent. For another example, if piezoelectric inkjet is to be used, the solvent may make up from about 60 wt % to about 70 wt % of the cosmetic agent, and the solvent may be ethanol, isopropanol, acetone, etc. In some piezoelectric formulations, water is not included.

In an example, the cosmetic agent further comprises an additive selected from the group consisting of a surfactant, an antimicrobial agent, an anti-kogation agent, a chelating agent, a buffer, and a combination thereof. In an example, the total amount of the additive(s) present in the cosmetic agent ranges from about 0.1 wt % to about 5 wt % based on the total weight of the cosmetic agent.

A surfactant may be desirable to assist in obtaining a particular wetting behavior of the cosmetic agent, e.g., on a hydrophobic build material. Examples of suitable surfactants that may be included in the cosmetic agent include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 from Air Products and Chemical Inc. or CARBOWET@ GA-211 from Evonik, previously known as SURFYNOL® CT-111) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 or TERGITOL™ 15-S-9 (a secondary alcohol ethoxylate) from The Dow Chemical Company). Still another example of a suitable surfactant includes alkyldiphenyloxide disulfonate surfactant (e.g., DOWFAX™ 8390 and DOWFAX™ 2A1 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the cosmetic agent may range from about 0.1 wt % to about 4 wt % based on the total weight of the cosmetic agent. In an example, the surfactant(s) is/are present in the cosmetic agent in an amount of about 0.75 wt % (based on the total weight of the cosmetic agent).

The cosmetic agent may include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® B20 (Thor), ACTICIDE® M20 (Thor), and combinations thereof.

In an example, the cosmetic agent may include a total amount of antimicrobial agents that ranges from about 0.1 wt % to about 1 wt %. In an example, the antimicrobial agent(s) is/are a biocide(s) and is/are present in the cosmetic agent in an amount of about 0.25 wt % (based on the total weight of the cosmetic agent).

An anti-kogation agent may also be included in the cosmetic agent (e.g., when the cosmetic agent is to be used with thermal inkjet printing). Kogation refers to the deposit of dried ink (e.g., cosmetic agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3 A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the cosmetic agent may range from about 0.1 wt % to about 2 wt % based on the total weight of the cosmetic agent. In an example, the anti-kogation agent(s) is/are present in the cosmetic agent in an amount of about 0.5 wt % (based on the total weight of the cosmetic agent).

The cosmetic agent may also include chelating agent(s). The chelating agent may be included to eliminate the deleterious effects of heavy metal impurities. Examples of suitable chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the cosmetic agent may range from greater than 0 wt % to about 2 wt % based on the total weight of the cosmetic agent. In an example, the chelating agent(s) is/are present in the cosmetic agent in an amount of about 0.04 wt % (based on the total weight of the cosmetic agent).

The cosmetic agent may also include a buffer, such as a pH buffer. One suitable pH buffer is 2-Amino-2-(hydroxymethyl)-1,3-propanediol (e.g., TRIZMA® from Sigma-Aldrich Co.).

The buffer(s) may be present in the cosmetic agent in an amount ranging from about 0.1 wt % to about 1 wt % of the total weight of the cosmetic agent. In an example, the buffer(s) is/are present in the cosmetic agent in an amount of about 0.1 wt % (based on the total weight of the cosmetic agent).

In an example, the cosmetic agent is devoid of a dispersant. The cosmetic agent may be devoid of a dispersant because the components of the cosmetic agent (e.g., the dye) may be water-soluble, solvent-soluble, and/or self-dispersible. Further, the lack of dispersant in the cosmetic agent being may improve the jettability of the cosmetic agent (as compared to a comparable cosmetic agent similar to the cosmetic agent but that contains a dispersant).

In another example, the cosmetic agent is devoid of a binder. The cosmetic agent may be devoid of a binder because a fusing agent causes the build material to fuse, which embeds the dye in the 3D part. As such, a binder that may otherwise aid in trapping the dye may not be utilized. Further, the lack of the binder in the cosmetic agent may improve the jettability of the cosmetic agent (as compared to a comparable cosmetic agent similar to the cosmetic agent but that contains a binder).

As used herein, the term "devoid of" when referring to a component (such as, e.g., a binder, a dispersant, etc.) may refer to a composition that does not include any added amount of the component, but may contain residual amounts, such as in the form of impurities. The components may be present in trace amounts, and in one aspect, in an amount of less than 0.1 weight percent (wt %) based on the total wt % of the composition (e.g., cosmetic agent), even though the composition is described as being "devoid of" the component. In other words, "devoid of" of a component may mean devoid of added component but allows for trace amounts or impurities inherently present in certain ingredients.

In one specific example of the cosmetic agent disclosed herein, the dye is present in an amount ranging from about 0.5 wt % to about 5 wt % based on a total weight of the cosmetic agent; the oxidizing agent is present in an amount ranging from about 1 wt % to about 5 wt % based on the total weight of the cosmetic agent; and the solvent is present in an amount ranging from about 5 wt % to about 70 wt % based on the total weight of the cosmetic agent.

In another specific example of the cosmetic agent disclosed herein, the dye is a black dye selected from the group consisting of Direct Black 168, Pacified Reactive Black 31, Acid Black 1, Food Black 2, JPD Black H-BKD, and combinations thereof; and the oxidizing agent is selected from the group consisting of potassium nitrate, benzoyl peroxide, hydrogen peroxide, potassium persulfate, potassium permanganate, nitric acid, sodium hypochlorite, and combinations thereof.

In some examples, the system and method disclosed herein may include another or second cosmetic agent. The other or second cosmetic agent may include another or second dye that is reducible in the presence of the antioxidant(s); another or second oxidizing agent to react with the antioxidant(s) and reduce reduction of the other or second dye; and another or second solvent; wherein the other or second dye maintains the other or second color in the presence of the build material. The other or second cosmetic agent may be used to impart the other or second color to another or second colored region. In some examples, the other or second color may be different than the color imparted by the first cosmetic agent. In other examples, the other or second color may be the same as or similar to the color imparted by the first cosmetic agent.

The other or second dye becomes embedded in the other or second region(s) of the 3D part to which the other or second cosmetic agent is applied and causes that/those other or second region(s) to be other or second colored region(s) and to exhibit the other or second color of the other or second dye. In some examples, the other or second dye maintains the other or second color in the presence of the build material because the other or second oxidizing agent reacts with the antioxidant(s) and at least substantially prevents reduction of the other or second dye. The other or second dye may be any of the examples of the dye and/or may be included in any of the amounts (except that the wt % is based on the total weight of the other or second cosmetic agent rather than the total weight of the first cosmetic agent) described above in reference to the first cosmetic agent. The other or second dye may be different than or the same as the dye included in the first cosmetic agent. Utilizing different dyes may allow for the formation of 3D parts with different colors or variations of a similar color in different regions (e.g., in the x-y plane) or in different layers (e.g., in the z-direction). The other or second dye may be included in the other or second cosmetic agent in an amount ranging from about 0.5 wt % to about 5 wt % based on the total weight of the other or second cosmetic agent.

The other or second oxidizing agent reacts with the antioxidant(s) in the build material to which the other or second cosmetic agent is applied, and thus at least substantially prevents the antioxidant(s) from reducing the other or second dye and degrading its color. The other or second oxidizing agent may be any of the examples of the oxidizing agent and/or may be included in any of the amounts (except that the wt % is based on the total weight of the other or second cosmetic agent rather than the total weight of the first cosmetic agent) described above in reference to the first cosmetic agent. The other or second oxidizing agent may be different than or the same as the oxidizing agent included in the first cosmetic agent.

The other or second solvent may be any of the examples of the solvent and/or may be included in any of the amounts (except that the wt % is based on the total weight of the other or second cosmetic agent rather than the total weight of the first cosmetic agent) described above in reference to the first cosmetic agent. The other or second solvent may be different than or the same as the solvent included in the first cosmetic agent.

The other or second cosmetic agent may include any of the other components (e.g., the co-solvent, the additive, etc.) in any of the amounts (except that the wt % is based on the total weight of the other or second cosmetic agent rather than the total weight of the first cosmetic agent) described in reference to the first cosmetic agent. The other or second cosmetic agent may be devoid of a dispersant and/or a binder. While one additional cosmetic agent has been described, it is to be understood that examples of the system and method disclosed herein may include and/or utilize any desirable number of different cosmetic agents.

As mentioned above, in some examples disclosed herein, a 3D printing composition is used. The 3D printing composition includes another example of the cosmetic agent and the oxidizing fluid. It may be desirable to use the cosmetic agent and the oxidizing fluid so that the amount of the oxidizing agent applied to react with the antioxidant in the build material is decoupled from the amount of the dye applied to impart the color to the colored region(s).

In an example, the 3D printing composition comprises the cosmetic agent, including the dye; and a first solvent; and the oxidizing fluid, including: the oxidizing agent to react with an antioxidant in a build material to reduce reduction of the dye in the presence of the antioxidant; and a second solvent.

When the cosmetic agent is used with the oxidizing fluid, the cosmetic agent may be as described above (e.g., include the co-solvent(s) and/or additive(s), be devoid of a dispersant and/or binder, etc.) except that the cosmetic agent may be devoid of the oxidizing agent (prior to being applied with the oxidizing fluid). In these examples, the cosmetic agent may be devoid of the oxidizing agent because the oxidizing agent is applied to the build material as part of the oxidizing fluid.

In some examples, this example of the cosmetic agent consists of: the dye that exhibits the color and is reducible in the presence of the antioxidant; and the first solvent. In these examples, the cosmetic agent includes no other components.

In other examples, this example of the cosmetic agent consists of: the dye that exhibits the color and is reducible in the presence of the antioxidant; the first solvent; the co-solvent; and the additive selected from the group consisting of the surfactant, the antimicrobial agent, the anti-kogation agent, the chelating agent, the buffer, and combinations thereof; wherein the dye maintains the color in the presence of the build material and the oxidizing fluid. In these examples, the cosmetic agent includes no other components.

In some examples, the oxidizing fluid includes the oxidizing agent to react with the antioxidant(s) and reduce reduction of the dye; and the second solvent. In these examples, the oxidizing fluid may include additional components. Examples of additional components that may be included in the oxidizing fluid include a co-solvent and an additive selected from the group consisting of a surfactant, an antimicrobial agent, an anti-kogation agent, a chelating agent, a buffer, and combinations thereof.

In other examples, the oxidizing fluid consists of: the oxidizing agent to react with the antioxidant(s) and reduce reduction of the dye; and the second solvent. In these examples, the oxidizing fluid includes no other components.

In still other examples, the oxidizing fluid consists of: the oxidizing agent to react with the antioxidant(s) and at reduce reduction of the dye; the second solvent; the co-solvent; and the additive selected from the group consisting of the surfactant, the antimicrobial agent, the anti-kogation agent, the chelating agent, the buffer, and combinations thereof. In these examples, the oxidizing fluid includes no other components.

The oxidizing fluid includes the oxidizing agent. In this example, the oxidizing agent reacts with the antioxidant(s) in the build material to which the cosmetic agent and the oxidizing fluid are applied, and thus at least substantially prevents the antioxidant(s) from reducing the dye and degrading its color. The oxidizing agent may be any of the examples and may be included in any of the amounts (except that the wt % is based on the total weight of the oxidizing fluid rather than the total weight of the cosmetic agent) described above in reference to the cosmetic agent.

When the oxidizing fluid is water-based, the aqueous nature of the oxidizing fluid may enable it to penetrate, at least partially, into the layer of build material (i.e., move into spaces between build material particles and/or absorb into build material particles). If the build material is hydrophobic, the presence of a co-solvent and/or a surfactant in the oxidizing fluid (whether the oxidizing fluid is water-based or non-aqueous based) may assist in obtaining a particular wetting behavior.

The oxidizing fluid includes the second solvent. The second solvent may be any of the examples of the solvent and/or may be included in any of the amounts (except that the wt % is based on the total weight of the oxidizing fluid rather than the total weight of the cosmetic agent) described above in reference to the cosmetic agent. The second solvent may be different than or the same as the first solvent included in the example of the cosmetic agent utilized with the oxidizing fluid.

The oxidizing fluid may include any of the other components (e.g., the co-solvent(s) and/or the additive(s)) in any of the amounts (except that the wt % is based on the total weight of the oxidizing fluid rather than the total weight of the cosmetic agent) described in reference to the cosmetic agent. The oxidizing fluid may be devoid of a dispersant and/or a binder. The oxidizing fluid may also be devoid of the dye and/or other colorants.

Multiple cosmetic agents may be used in combination with the oxidizing fluid. When multiple cosmetic agents are used, the cosmetic agents may be similar (i.e., may each include the first solvent, the co-solvent and/or the additive (s)) but may include different dyes.

Referring now to FIG. 1, an example of a 3D printing system 10 is schematically depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

In an example, the three-dimensional (3D) printing system 10, comprises: a supply 14 of polymeric or polymeric composite build material 16 including an antioxidant; a build material distributor 18; a supply of the cosmetic agent 26 including: the oxidizing agent to react with the antioxidant and reduce reduction of the dye; the dye; and the solvent; a first applicator 24A for selectively dispensing the cosmetic agent 26; a supply of a fusing agent 28; a second applicator 24B for selectively dispensing the fusing agent 28; a source 36, 36' of electromagnetic radiation 46 (see, e.g., FIGS. 3C and 3D); a controller 32; and a non-transitory computer readable medium having stored thereon computer executable instructions to cause the controller 32 to: utilize the build material distributor 18 to dispense the polymeric or polymeric composite build material 16; utilize the first applicator 24A and the second applicator 24B to respectively and selectively dispense the cosmetic agent 26 and the fusing agent 28 on at least a portion 42 (see, e.g., FIG. 3C) of the polymeric or polymeric composite build material 16; and utilize the source 36, 36' of electromagnetic radiation 46 to expose the polymeric or polymeric composite build material 16 to electromagnetic radiation 46 to fuse the portion of the polymeric or polymeric composite build material to form a colored region 50 of a layer 48, the colored region 50 of the layer 48 having the dye of the cosmetic agent 26 embedded therein and maintaining the color of the dye.

When the 3D printing composition is utilized, the system 10 shown in FIG. 1 may additionally include a supply of the oxidizing fluid (not shown) and/or a third applicator (not shown) for selectively dispensing the oxidizing fluid. When the 3D printing composition is utilized, the computer executable instructions may also cause the controller 32 to utilize the third applicator to selectively dispense the oxidizing fluid on the at least a portion 42 of the polymeric or polymeric composite build material 16.

As shown in FIG. 1, the printing system 10 includes the build area platform 12, the build material supply 14 containing polymeric or polymeric composite build material particles 16 including the antioxidant(s), and the build material distributor 18.

The build area platform 12 receives the polymeric or polymeric composite build material 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

Figure 5:
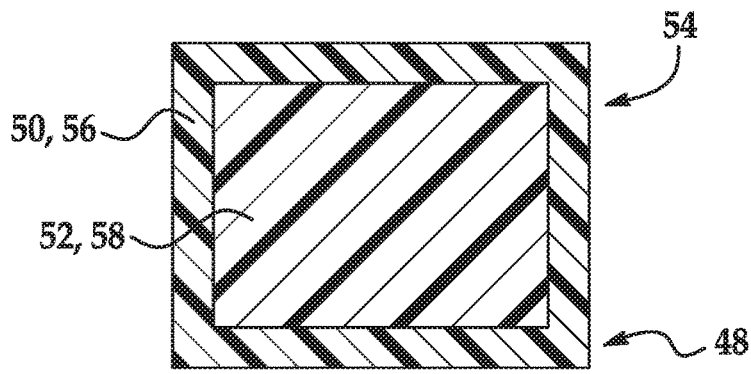
FIG. 5 is a cross-sectional view of an example of a part formed using an example of the 3D printing method disclosed herein.

The build area platform 12 may be moved in a direction as denoted by the arrow 20, e.g., along the z-axis, so that the polymeric or polymeric composite build material 16 may be delivered to the platform 12 or to a previously formed layer 48 (see, e.g., FIG. 3E) of the 3D part 54 (see, e.g., FIG. 5). In an example, when the polymeric or polymeric composite build material particles 16 are to be delivered, the build area platform 12 may be programmed to advance (e.g., downward) enough so that the build material distributor 18 can push the polymeric or polymeric composite build material particles 16 onto the platform 12 to form a substantially uniform layer 40 of the polymeric or polymeric composite build material 16 thereon (see, e.g., FIGS. 3A and 3B). The build area platform 12 may also be returned to its original position, for example, when a new part is to be built.

The build material supply 14 may be a container, bed, or other surface that is to position the polymeric or polymeric composite build material particles 16 between the build material distributor 18 and the build area platform 12. In some examples, the build material supply 14 may include a surface upon which the polymeric or polymeric composite build material particles 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the polymeric or polymeric composite build material particles 16 from a storage location to a position to be spread onto the build area platform 12 or onto a previously formed layer 48 of the 3D part 54.

The build material distributor 18 may be moved in a direction as denoted by the arrow 22, e.g., along the y-axis, over the build material supply 14 and across the build area platform 12 to spread a layer 40 of the polymeric or polymeric composite build material 16 over the build area platform 12. The build material distributor 18 may also be returned to a position adjacent to the build material supply 14 following the spreading of the polymeric or polymeric composite build material particles 16. The build material distributor 18 may be a blade (e.g., a doctor blade), a roller, a combination of a roller and a blade, and/or any other device capable of spreading the polymeric or polymeric composite build material 16 over the build area platform 12. For instance, the build material distributor 18 may be a counter-rotating roller.

The polymeric or polymeric composite build material particles 16 may be a polymeric build material or a polymeric composite build material. As used herein, the term "polymeric build material" may refer to crystalline or semi-crystalline polymer particles. As used herein, the term "polymeric composite build material" may refer to composite particles made up of polymer and ceramic. Any of the polymeric or polymeric composite build material particles 16 may be in powder form.

Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other examples of crystalline or semi-crystalline polymers suitable for use as the build material particles 16 include polyethylene, polypropylene, and polyoxomethylene (i.e., polyacetals). Still other examples of suitable build material particles 16 include polystyrene, polycarbonate, polyester, polyurethanes, other engineering plastics, and blends of any two or more of the polymers listed herein.

Any of the previously listed crystalline or semi-crystalline polymer particles may be combined with ceramic particles to form the polymeric composite build material particles 16. Examples of suitable ceramic particles include metal oxides, inorganic glasses, carbides, nitrides, and borides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof. The amount of ceramic particles that may be combined with the crystalline or semi-crystalline polymer particles may depend on the materials used and the 3D part 54 (see, e.g., FIG. 5) to be formed. In one example, the ceramic particles may be present in an amount ranging from about 1 wt % to about 20 wt % based on the total wt % of the polymeric composite build material particles 16.

The polymeric or polymeric composite build material particles 16 may have a melting point or softening point ranging from about 50° C. to about 400° C. Depending upon the composition of the composite, the melting or softening point may be higher or lower. As an example, the build material particles 16 may be a polyamide having a melting point of about 180° C.

The polymeric or polymeric composite build material particles 16 may be made up of similarly sized particles or differently sized particles. In the examples shown herein (FIG. 1 and FIGS. 3A-3E), the polymeric or polymeric composite build material 16 includes similarly sized particles. The term "size", as used herein with regard to the polymeric or polymeric composite build material particles 16, refers to the diameter of a spherical particle, or the average diameter of a non-spherical particle (i.e., the average of multiple diameters across the particle), or the volume-weighted mean diameter of a particle distribution. In an example, the average size of the polymeric or polymeric composite build material particles 16 ranges from about 2 μm to about 200 μm. In another example, the average size of the polymeric or polymeric composite build material particles 16 ranges from about 20 μm to about 90 μm. In still another example, the average size of the polymeric or polymeric composite build material particles 16 is about 60 μm.

As mentioned above, the polymeric or polymeric composite build material 16 includes the antioxidant in addition to polymeric or polymeric composite particles. The antioxidant(s) may be added to the polymeric or polymeric composite build material 16 to prevent or slow molecular weight decreases of the polymeric or polymeric composite build material 16 and/or to prevent or slow discoloration (e.g., yellowing) of the polymeric or polymeric composite build material 16 by preventing or slowing oxidation of the polymeric or polymeric composite build material 16.

In some examples, the antioxidant that may be included in the polymeric or polymeric composite build material 16 is a radical scavenger. In these examples, the antioxidant may include IRGANOX® 1098 (benzenepropanamide, N,N-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester).

In an example, the antioxidant may be included in the polymeric or polymeric composite build material 16 in an amount ranging from about 0.01 wt % to about 10 wt % based on the total weight of the polymeric or polymeric composite build material 16.

It is to be understood that the polymeric or polymeric composite build material 16 may include, in addition to polymeric or polymeric composite particles and the antioxidant, a brightener, a charging agent, a flow aid, or combinations thereof.

Brightener(s) may be added to the polymeric or polymeric composite build material 16 to improve visibility so that the color of the dye may be more easily observed. Examples of suitable brighteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), and combinations thereof. In some examples, a stilbene derivative may be used as the brightener. In these examples, the temperature(s) of the 3D printing process may be below a threshold temperature above which the stilbene derivative may become unstable. In an example, the brightener may be included in the polymeric or polymeric composite build material 16 in an amount ranging from about 0.01 wt % to about 10 wt % based on the total weight of the polymeric or polymeric composite build material 16.

Charging agent(s) may be added to the polymeric or polymeric composite build material 16 to suppress tribocharging. Examples of suitable charging agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total weight of the polymeric or polymeric composite build material 16.

Flow aid(s) may be added to improve the coating flowability of the polymeric or polymeric composite build material 16. Flow aids may be particularly beneficial when the particles of the polymeric or polymeric composite build material 16 are less than 25 μm in size. The flow aid improves the flowability of the polymeric or polymeric composite build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total weight of the polymeric or polymeric composite build material 16.

As shown in FIG. 1, the printing system 10 also includes the first applicator 24A, which may contain the cosmetic agent 26. As mentioned above, in some examples, the cosmetic agent 26 includes the oxidizing agent to react with the antioxidant(s) and reduce reduction of the dye; the dye; and the solvent. In other examples in which the oxidizing fluid is used, the cosmetic agent 26 does not include oxidizing agent, but does include the dye; and the solvent. It is to be understood that one applicator 24A or multiple applicators may be used to dispense the cosmetic agent 26 (including the oxidizing agent) or the cosmetic agent and the oxidizing fluid.

As depicted in FIG. 1, some examples of the printing system 10 may include a second applicator 24B in addition to the first applicator 24A. In one example, the printing system 10 includes the second applicator 24B, which may contain the fusing agent 28.

Examples of the fusing agent 28 are dispersions including a radiation absorbing agent (i.e., an active material). The active material may be any infrared light absorbing colorant. In an example, the active material is a near-infrared light absorber. Any near-infrared colorants, e.g., those produced by Fabricolor, Eastman Kodak, or Yamamoto, may be used in the fusing agent 28. As one example, the fusing agent 28 may be a printing liquid formulation including carbon black as the active material. Examples of this printing liquid formulation are commercially known as CM997A, 516458, C18928, C93848, C93808, or the like, all of which are available from HP Inc.

As another example, the fusing agent 28 may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water soluble near-infrared absorbing dyes selected from the group consisting of:

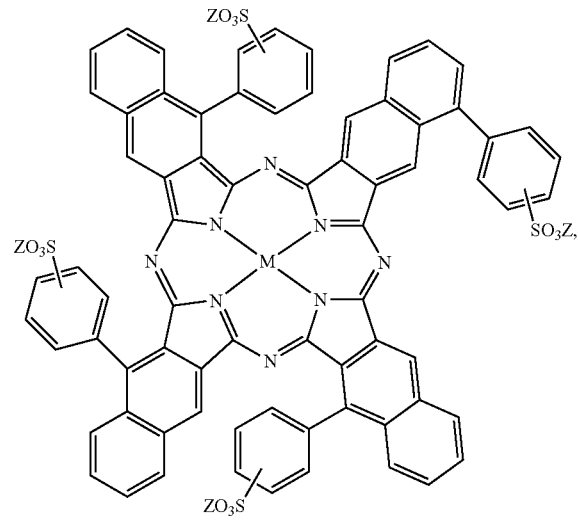

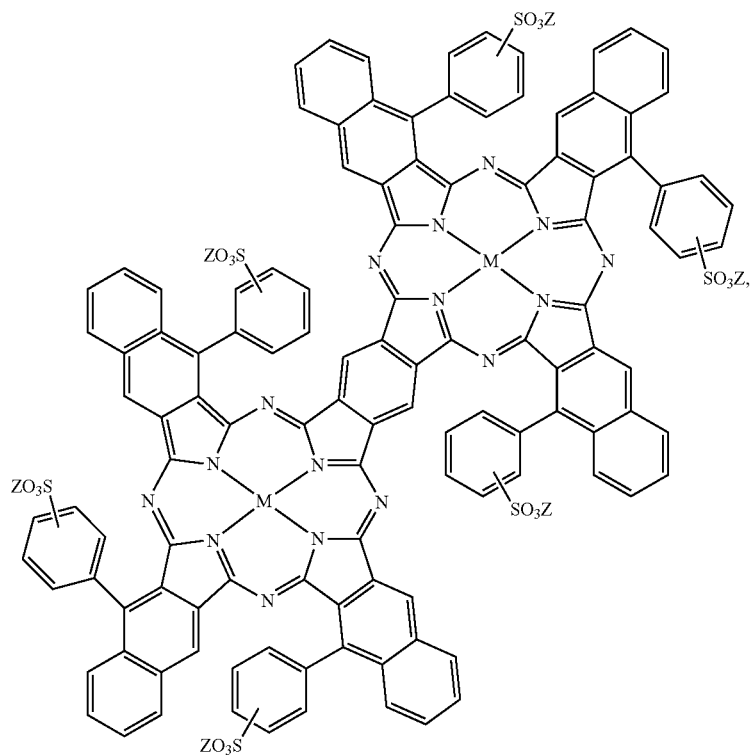
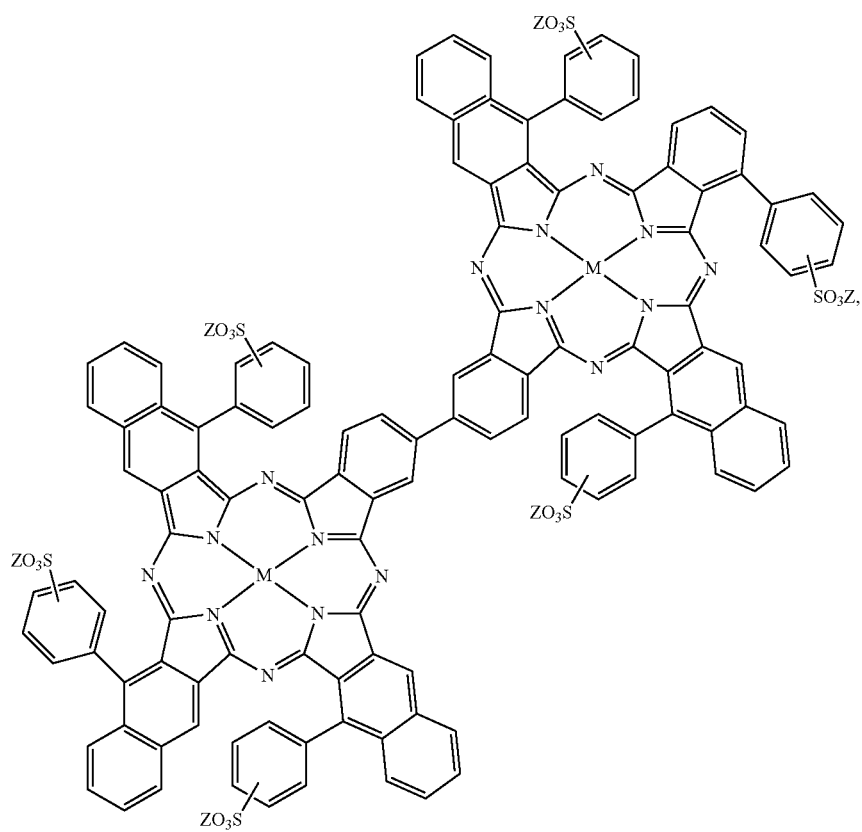

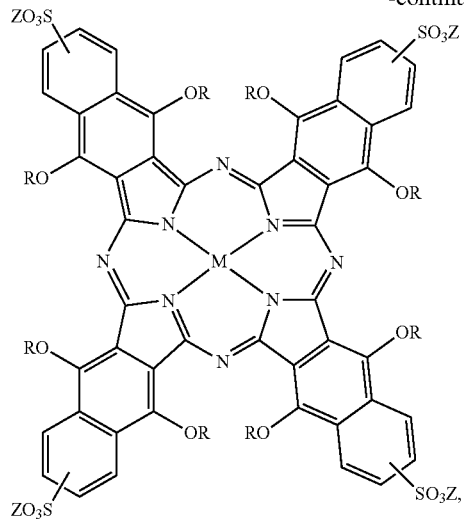

and mixtures thereof. In the above formulations, M can be a divalent metal atom (e.g., copper, etc.) or can have OSO₃Na axial groups filling any unfilled valencies if the metal is more than divalent (e.g., indium, etc.), R can be any C1-C8 alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

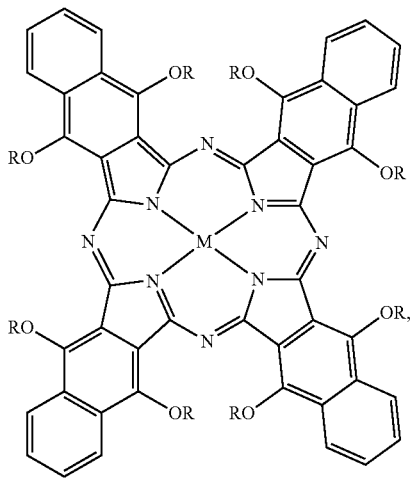

-continued

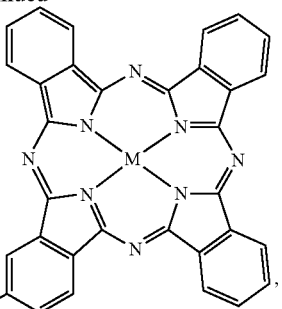

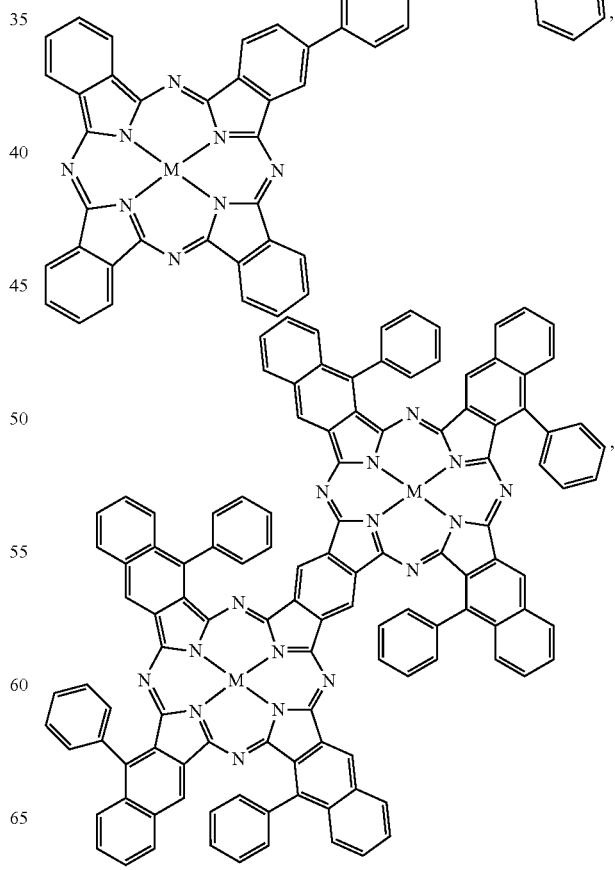

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be any C1-C8 alkyl group (including substituted alkyl and unsubstituted alkyl).

The amount of the active material that is present in the fusing agent 28 ranges from greater than 0 wt % to about 40 wt % based on the total wt % of the fusing agent 28. In other examples, the amount of the active material in the fusing agent 28 ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the fusing agent 28 having jetting reliability and heat and/or radiation absorbance efficiency.

As used herein, "FA vehicle" may refer to the liquid fluid in which the active material is placed to form the fusing agent 28. A wide variety of FA vehicles, including aqueous and non-aqueous vehicles, may be used in the fusing agent 28. In some instances, the FA vehicle may include water alone or a non-aqueous solvent alone. In other instances, the FA vehicle may further include co-solvent(s), surfactant(s), antimicrobial agent(s), anti-kogation agent(s), chelating agent(s), buffer(s), or combinations thereof.

Similar to the cosmetic agent 26 (and the oxidizing fluid when used), when the FA vehicle is water-based, the aqueous nature of the fusing agent 28 enables the fusing agent 28 to penetrate, at least partially, into the layer 40 of the polymeric or polymeric composite build material particles 16. As mentioned above, the polymeric or polymeric composite build material particles 16 may be hydrophobic, and the presence of the co-solvent and/or the surfactant in the fusing agent 28, when the fusing agent 28 is water-based or non-aqueous based, may assist in obtaining a particular wetting behavior.

The fusing agent 28 may include any of the previously listed co-solvent(s), surfactant(s), antimicrobial agent(s), anti-kogation agent(s), and/or chelating agent(s) in the previously described amounts (except that the wt % is based on the total weight of the fusing agent 28 rather than the cosmetic agent 26).

The balance of the fusing agent 28 is water or the non-aqueous solvent. As an example, deionized water may be used. As another example, dimethyl sulfoxide (DMSO), acetone, acetates, alcohols (e.g., ethanol), or the like may be used as the non-aqueous solvent. The balance of the fusing agent 28 may depend, in part upon the jetting technology that is to be used to dispense the fusing agent 28. For example, if thermal inkjet is to be used, the balance may be water and/or ethanol. For another example, if piezoelectric inkjet is to be used, the balance may be a variety of solvents, such as methanol, ethanol, isopropanol, acetone, methyl ethyl ketone, other ketones, acetates (e.g., methyl acetate), ethylene glycol ethers, propylene glycol ethers, diols (e.g., 1,3-propanediol), polyols (e.g., glycerol), etc.

As mentioned above, some examples of the system 10 and method 100 (see FIG. 2), 200 (see, e.g., FIGS. 3A through 3E), 300 (see FIG. 4) disclosed herein may include another or second cosmetic agent and/or the oxidizing fluid. In the examples in which the system 10 and method 100, 200, 300 include the other or second cosmetic agent and/or the oxidizing fluid, other (e.g., third and/or fourth) applicator(s) (not shown) may apply the other or second cosmetic agent and/or the oxidizing fluid. The third and/or fourth applicator(s) may be separate cartridge(s) (for dispensing the other or second cosmetic agent and/or the oxidizing fluid) within the first applicator 24A or the second applicator 24B, or it/they may be separate applicator(s). When the third and/or fourth applicator(s) is/are separate applicator(s) it/they may be similar to the first and second applicator(s) 24A, 24B.

The applicator(s) 24A, 24B may be scanned across the build area platform 12 in the direction indicated by the arrow 30, e.g., along the y-axis. The applicator(s) 24A, 24B may be, for instance, a thermal inkjet printhead, a piezoelectric printhead, a continuous inkjet printhead, etc., and may extend a width of the build area platform 12. While each of the applicator(s) 24A, 24B is shown in FIG. 1 as a single applicator, it is to be understood that each of the applicator(s) 24A, 24B may include multiple applicators that span the width of the build area platform 12. Additionally, the applicator(s) 24A, 24B may be positioned in multiple printbars. The applicator(s) 24A, 24B may also be scanned along the x-axis, for instance, in configurations in which the applicator(s) 24A, 24B does/do not span the width of the build area platform 12 to enable the applicator(s) 24A, 24B to respectively deposit the cosmetic agent 26 and the fusing agent 28 over a large area of a layer 40 of polymeric or polymeric composite build material particles 16. The applicator(s) 24A, 24B may thus be attached to a moving XY stage or a translational carriage (neither of which is shown) that moves the applicator(s) 24A, 24B adjacent to the build area platform 12 in order to deposit the cosmetic agent 26 and the fusing agent 28 (respectively) in predetermined areas of a layer 40 of the polymeric or polymeric composite build material particles 16 that has been formed on the build area platform 12 in accordance with the method(s) 100, 200, 300 disclosed herein. The applicator(s) 24A, 24B may include a plurality of nozzles (not shown) through which the cosmetic agent 26 and the fusing agent 28 (respectively) are to be ejected.

The applicators 24A, 24B may respectively deliver drops of the cosmetic agent 26 and the fusing agent 28 at a resolution ranging from about 300 dots per inch (DPI) to about 1200 DPI. In other examples, the applicator(s) 24A, 24B may deliver drops of the respective fluids 26, 28 at a higher or lower resolution. The drop velocity may range from about 5 m/s to about 24 m/s and the firing frequency may range from about 1 kHz to about 100 kHz. In one example, each drop may be in the order of about 10 picoliters (pl) per drop, although it is contemplated that a higher or lower drop size may be used. In some examples, the applicators 24A, 24B are able to deliver variable size drops of the fluids 26, 28, respectively.

Each of the previously described physical elements may be operatively connected to a controller 32 of the printing system 10. The controller 32 may process print data that is based on a 3D object model of the 3D object/part to be generated. In response to data processing, the controller 32 may control the operations of the build area platform 12, the build material supply 14, the build material distributor 18, and the applicator(s) 24A, 24B. As an example, the controller 32 may control actuators (not shown) to control various operations of the 3D printing system 10 components. The controller 32 may be a computing device, a semiconductor-based microprocessor, a central processing unit (CPU), an application specific integrated circuit (ASIC), and/or another hardware device. The controller 32 may be connected to the 3D printing system 10 components via communication lines.

The controller 32 manipulates and transforms data, which may be represented as physical (electronic) quantities within the printer's registers and memories, in order to control the physical elements to create the 3D part. As such, the controller 32 is depicted as being in communication with a data store 34. The data store 34 may include data pertaining to a 3D part to be printed by the 3D printing system 10. The data for the selective delivery of the polymeric or polymeric composite build material particles 16, the cosmetic agent 26, the fusing agent 28, the oxidizing fluid (when utilized), etc. may be derived from a model of the 3D part to be formed. For instance, the data may include the locations on each layer of polymeric or polymeric composite build material particles 16 that the first applicator 24A is to deposit the cosmetic agent 26 and the locations that the second applicator 24B is to deposit the fusing agent 28. In one example, the controller 32 may use the data to control the first applicator 24A to selectively apply the cosmetic agent 26. In another example, the controller 32 may use the data to control the second applicator 24B to selectively apply the fusing agent 28. The data store 34 may also include machine readable instructions (stored on a non-transitory computer readable medium) that are to cause the controller 32 to control the amount of polymeric or polymeric composite build material particles 16 that is supplied by the build material supply 14, the movement of the build area platform 12, the movement of the build material distributor 18, the movement of the applicator(s) 24A, 24B, etc.

As shown in FIG. 1, the printing system 10 may also include a source 36, 36' of electromagnetic radiation 46. In some examples, the source 36 of electromagnetic radiation 46 may be in a fixed position with respect to the build material platform 12. In other examples, the source 36' of electromagnetic radiation 46 may be positioned to apply electromagnetic radiation 46 (see, e.g., FIG. 3C) to the layer 40 of polymeric or polymeric composite build material particles 16 immediately after the fusing agent 28 has been applied thereto. In the example shown in FIG. 1, the source 36' of electromagnetic radiation 46 is attached to the side of the applicators 24A, 24B which allows for patterning and heating/exposing to electromagnetic radiation 46 in a single pass.

The source 36, 36' of electromagnetic radiation 46 may emit electromagnetic radiation 46 having wavelengths ranging from about 800 nm to about 1 mm. As one example, the electromagnetic radiation 46 may range from about 800 nm to about 2 μm. As another example, the electromagnetic radiation 46 may be blackbody radiation with a maximum intensity at a wavelength of about 1100 nm. The source 36, 36' of electromagnetic radiation 46 may be infrared (IR) or near-infrared light sources, such as IR or near-IR curing lamps, IR or near-IR light emitting diodes (LED), or lasers with the desirable IR or near-IR electromagnetic wavelengths.

The source 36, 36' of electromagnetic radiation 46 may be operatively connected to a lamp/laser driver, an input/output temperature controller, and temperature sensors, which are collectively shown as radiation system components 38. The radiation system components 38 may operate together to control the source 36, 36' of electromagnetic radiation 46. The temperature recipe (e.g., radiation exposure rate) may be submitted to the input/output temperature controller. During heating, the temperature sensors may sense the temperature of the polymeric or polymeric composite build material particles 16, and the temperature measurements may be transmitted to the input/output temperature controller. For example, a thermometer associated with the heated area can provide temperature feedback. The input/output temperature controller may adjust the source 36, 36' of electromagnetic radiation 46 power set points based on any difference between the recipe and the real-time measurements. These power set points are sent to the lamp/laser drivers, which transmit appropriate lamp/laser voltages to the source 36, 36' of electromagnetic radiation 46. This is one example of the radiation system components 38, and it is to be understood that other radiation source control systems may be used. For example, the controller 32 may be configured to control the source 36, 36' of electromagnetic radiation 46.

Referring now to FIG. 2 and FIGS. 3A through 3E, an example of the 3D printing method 100, 200 is depicted. This example of the method 100, 200 uses the cosmetic agent 26, which includes the oxidizing agent, the dye, and the solvent. This example of the method 100, 200 does not use the oxidizing fluid. This method 100, 200 may be used to form 3D printed parts 54 (see, e.g., FIG. 5) with colored region(s) 50.

Prior to execution of the method 100, 200 or as part of the method 100, 200 the controller 32 may access data stored in the data store 34 pertaining to a 3D part that is to be printed. The controller 32 may determine the number of layers of polymeric or polymeric composite build material 16 that are to be formed, the locations at which the cosmetic agent 26 from the first applicator 24A is to be deposited on each of the respective layers, and the locations at which the fusing agent 28 from the second applicator 24B is to be deposited on each of the respective layers.

Briefly, the three-dimensional (3D) printing method 100 comprises: applying the polymeric or polymeric composite build material 16, the polymeric or polymeric composite build material 16 including the antioxidant (reference numeral 102); selectively applying the cosmetic agent 26 on at least a portion 42 of the polymeric or polymeric composite build material 16, the cosmetic agent 26 including: a dye; an oxidizing agent to react with the antioxidant in the build material to reduce reduction of the dye in the presence of the antioxidant; and a solvent (reference numeral 104); selectively applying a fusing agent 28 on the at least the portion 42 of the polymeric or polymeric composite build material 16 (reference numeral 106); and exposing the polymeric or polymeric composite build material 16 to electromagnetic radiation 46 to fuse the at least the portion 42 of the polymeric or polymeric composite build material 16 to form a colored region 50 of a layer 48, the colored region 50 of the layer 48 having the dye of the cosmetic agent 26 embedded therein and maintaining a color of the dye (reference numeral 108).

Figure 2:
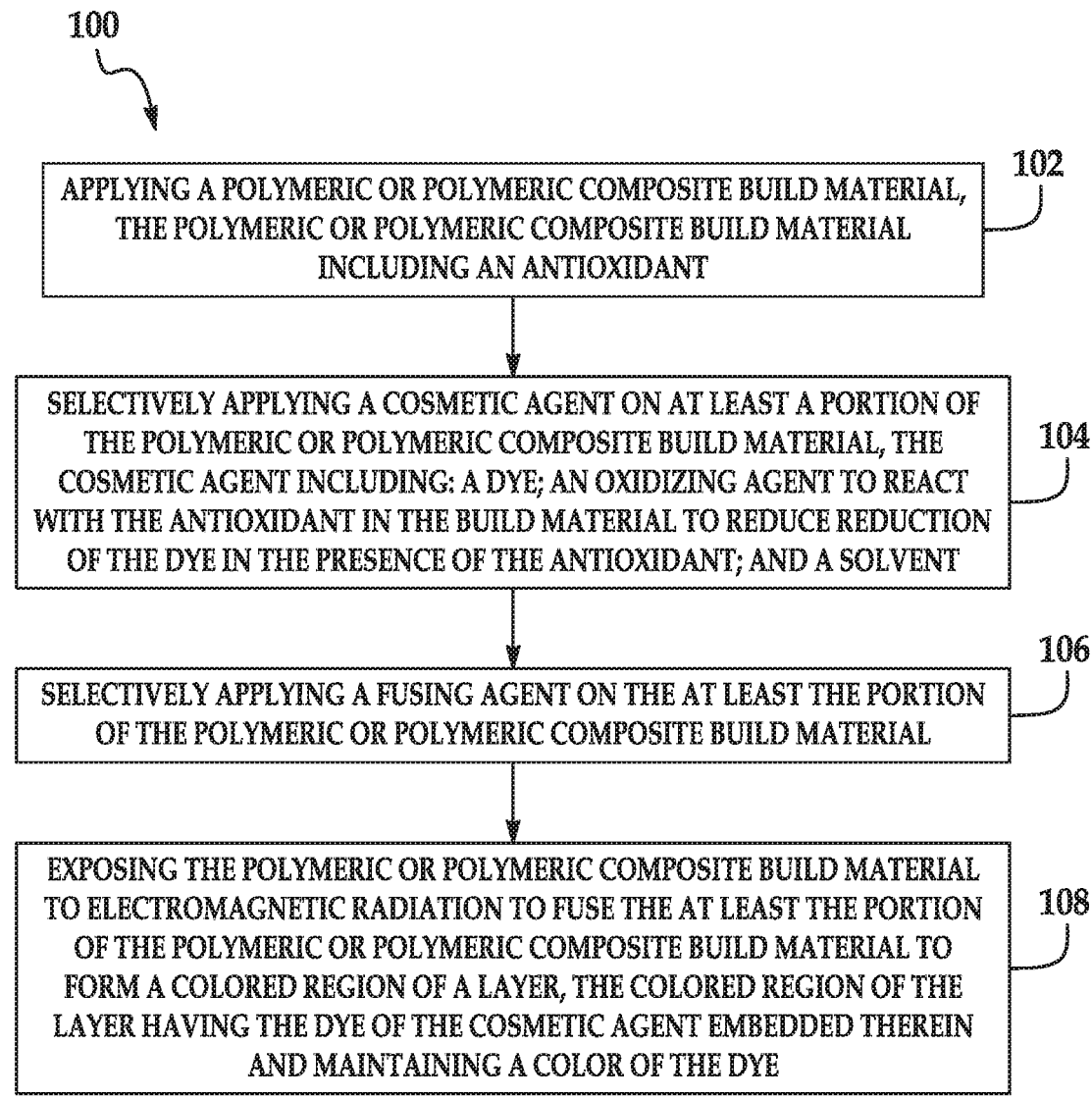
FIG. 2 is a flow diagram illustrating an example of a 3D printing method disclosed herein.
Figure 3A:
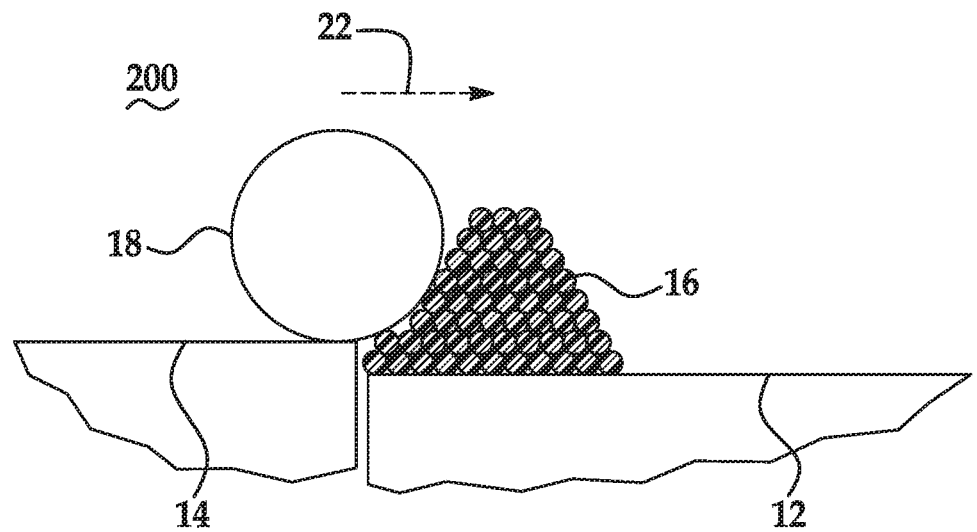
FIGS. 3A through 3E are schematic and partially cross-sectional views depicting the formation of a 3D part using an example of a 3D printing method disclosed herein.
Figure 3B:
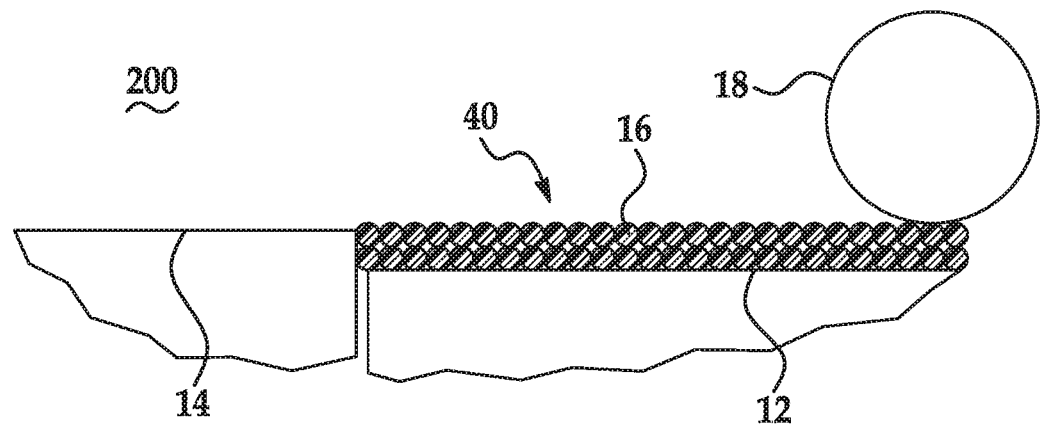

As shown at reference numeral 102 in FIG. 2 and in FIGS. 3A and 3B, the method 100, 200 includes applying the polymeric or polymeric composite build material 16 (the polymeric or polymeric composite build material 16 including the antioxidant). In FIG. 3A, the build material supply 14 may supply the polymeric or polymeric composite build material particles 16 into a position so that they are ready to be spread onto the build area platform 12. In FIG. 3B, the build material distributor 18 may spread the supplied polymeric or polymeric composite build material particles 16 onto the build area platform 12. The controller 32 (not shown in FIGS. 3A and 3B) may process control build material supply data, and in response control the build material supply 14 to appropriately position the polymeric or polymeric composite build material particles 16, and may process control spreader data, and in response control the build material distributor 18 to spread the supplied polymeric or polymeric composite build material particles 16 over the build area platform 12 to form a layer 40 of polymeric or polymeric composite build material particles 16 thereon. As shown in FIG. 3B, one layer 40 of the polymeric or polymeric composite build material particles 16 has been applied.

The layer 40 has a substantially uniform thickness across the build area platform 12. In an example, the thickness of the layer 40 is about 100 μm. In another example, the thickness of the layer 40 ranges from about 50 μm to about 300 μm, although thinner or thicker layers may also be used. For example, the thickness of the layer 40 may range from about 20 μm to about 500 μm, or from about 30 μm to about 300 μm. The layer thickness may be about 2× (i.e., 2 times) the particle diameter (as shown in FIG. 3B) at a minimum for finer part definition. In some examples, the layer thickness may be about 1.2× the particle diameter.

Prior to further processing, the layer 40 of the polymeric or polymeric composite build material particles 16 may be exposed to heating. Heating may be performed to pre-heat the polymeric or polymeric composite build material particles 16, and thus the heating temperature may be below the melting point or softening point of the polymeric or polymeric composite build material particles 16. As such, the temperature selected will depend upon the polymeric or polymeric composite build material particles 16 that are used. As examples, the pre-heating temperature may be from about 5° C. to about 50° C. below the melting point or softening point of the polymeric or polymeric composite build material particles 16. In an example, the pre-heating temperature ranges from about 50° C. to about 250° C. In another example, the pre-heating temperature ranges from about 150° C. to about 170° C.

Pre-heating the layer 40 of the polymeric or polymeric composite build material particles 16 may be accomplished using any suitable heat source that exposes all of the polymeric or polymeric composite build material particles 16 on the build material surface 12 to the heat. Examples of the heat source include a thermal heat source (e.g., a heater (not shown) integrated into the platform 12) or the radiation source 36, 36'.

Figure 3C:
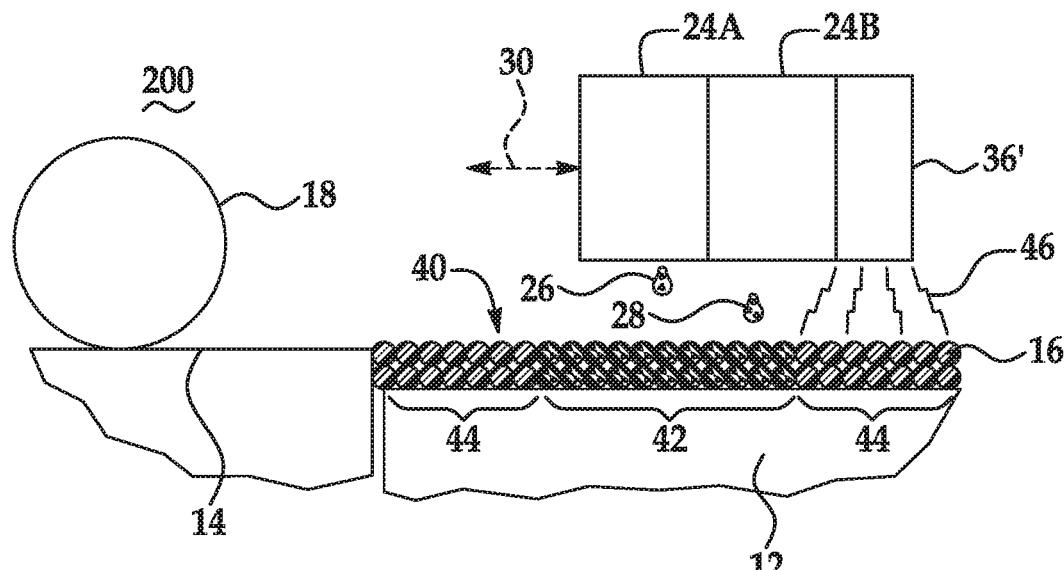

As shown at reference numeral 104 in FIG. 2 and in FIG. 3C, the method 100, 200 continues by selectively applying the cosmetic agent 26 on at least a portion 42 of the polymeric or polymeric composite build material 16. As mentioned above, the cosmetic agent 26 may include the dye, the oxidizing agent to react with the antioxidant(s) and at least substantially prevent reduction of the dye, and the solvent.

In an example of the method 100, 200, upon the selectively applying of the cosmetic agent 26, the oxidizing agent in the cosmetic agent 26 reacts with the antioxidant(s) in the at least the portion 42 of the polymeric or polymeric composite build material 16; and after the oxidizing agent 26 reacts with the antioxidant(s), there is little or no unreacted antioxidant(s) in the at least the portion 42 of the polymeric or polymeric composite build material 16 available to reduce the dye. Thus, the oxidizing agent at least substantially prevents reduction of the dye.

As shown at reference numeral 106 in FIG. 2 and in FIG. 3C, the method 100, 200 also includes selectively applying the fusing agent 28 on the at least the portion 42 of the polymeric or polymeric composite build material 16. As mentioned above, the fusing agent 28 includes the active material and the FA vehicle.

As illustrated in FIG. 3C, the cosmetic agent 26 may be dispensed from the first applicator 24A, and the fusing agent 28 may be dispensed from the second applicator 24B. In an example, the cosmetic agent 26 may be dispensed onto the portion 42 first, and then the fusing agent 28 may be dispensed onto the portion 42. In another example, the fusing agent 28 may be dispensed onto the portion 42 first, and then the cosmetic agent 26 may be dispensed onto the portion 42. In still another example, the cosmetic agent 26 and the fusing agent 28 may be dispensed at least substantially simultaneously (e.g., one immediately after the other in a single printing pass, or at the same time).

The applicators 24A and/or 24B may each be a thermal inkjet printhead, a piezoelectric printhead, etc., and each of the selectively applying of the cosmetic agent 26 and the selectively applying of the fusing agent 28 may be accomplished by thermal inkjet printing, piezo electric inkjet printing, etc. Although shown as separate applicators 24A, 24B, it is to be understood that a single applicator with individual cartridges for dispensing the respective fluids 26, 28 may be used.

The cosmetic agent 26 and the fusing agent 28 each may be dispensed at an ink flux ranging from about 0.1 ng to about 48 ng per $1/600^{th}$ sq. in. In an example, 3 drops or 27 ng per $1/600^{th}$ sq. in. of the cosmetic agent 26 may be deposited (using a printhead architecture with a 9 ng drop size).

The controller 32 may process data, and in response, control the first applicator 24A (e.g., in the directions indicated by the arrow 30) to deposit the cosmetic agent 26 onto predetermined portion(s) 42 of the polymeric or polymeric composite build material 16 that are to form the colored region 50 of the layer 48. The colored region 50 of the layer 48 has the dye of the cosmetic agent 26 embedded therein. The first applicator 24A may be programmed to receive commands from the controller 32 and to deposit the cosmetic agent 26 according to a pattern of a cross-section for the colored region 50 (of the layer of the 3D part that is to be formed) that is to exhibit the color of the dye. In the example shown in FIG. 3C, the first applicator 24B selectively applies the cosmetic agent 26 on those portion(s) 42 of the layer 40 that is/are to exhibit the color of the dye in the first layer of the 3D part 54. In the example shown in FIG. 3C, the cosmetic agent 26 is deposited in a square pattern on the portion 42 of the layer 40 and not on the portions 44.

When the cosmetic agent 26 is selectively applied in the desired area(s) of the portion(s) 42, the dye (present in the cosmetic agent 26) infiltrates the inter-particles spaces among the polymeric or polymeric composite build material 16. The volume of the cosmetic agent 26 that is applied per unit of the polymeric or polymeric composite build material 16 in the patterned portion 42 may be sufficient to achieve a colored region 50 that is the color of the dye.

The controller 32 may also process data, and in response, control the second applicator 24B (e.g., in the directions indicated by the arrow 30) to deposit the fusing agent 28 onto predetermined region(s) of the portion 42 of the polymeric or polymeric composite build material 16 that are to become part of the 3D part 54. The second applicator 24B may be programmed to receive commands from the controller 32 and to deposit the fusing agent 28 according to a pattern of a cross-section for the layer of the 3D part that is to be formed. As used herein, the cross-section of the layer of the 3D part to be formed refers to the cross-section that is parallel to the surface of the build area platform 12. In the example shown in FIG. 3C, the second applicator 24A selectively applies the fusing agent 28 on those portion(s) 42 of the layer 40 that is/are to become the first layer of the 3D part 54. As an example, if the 3D part that is to be formed is to be shaped like a cube or cylinder, the fusing agent 28 will be deposited in a square pattern or a circular pattern (from a top view), respectively, on at least a portion of the layer 40 of the polymeric or polymeric composite build material particles 16. In the example shown in FIG. 3C, the fusing agent 28 is deposited in a square pattern on the portion 42 of the layer 40 and not on the portions 44.

As mentioned above, the fusing agent 28 may include the active material and the FA vehicle. The volume of the fusing agent 28 that is applied per unit of the polymeric or polymeric composite build material 16 in the patterned portion 42 may be sufficient to absorb and convert enough electromagnetic radiation 46 so that the polymeric or polymeric composite build material 16 in the patterned portion 42 will fuse. The volume of the fusing agent 28 that is applied per unit of the polymeric or polymeric composite build material 16 may depend, at least in part, on the active material used, the active material loading in the fusing agent 28, and the polymeric or polymeric composite build material 16 used.

In some examples, such as the example shown in FIG. 3C, the cosmetic agent 26 and the fusing agent 28 are applied in the same portion(s) (e.g., portion 42). In these examples, the colored region 50 containing the dye, and thus exhibiting the color of the dye, is the entire layer 48 of the 3D part 54. In other examples, the fusing agent 28 may be applied to an interior portion of a layer and/or to interior layer(s) 58 of a 3D part 54, and to exterior portion(s) of a layer and/or to exterior layer(s) 56 of the 3D part 54, and the cosmetic agent 26 may be applied to the exterior portion(s) of the layer and/or to the exterior layer(s) 56 of the 3D part 54. In the latter examples, the color of the dye will be exhibited at the exterior of the part 54.

While the portion 42 of the layer 40 is shown having both the cosmetic agent 26 and the fusing agent 28 applied thereto, it is to be understood that in some examples of the method 100, 200 some area(s) of the portion 42 may have the fusing agent 28 applied thereto, but may not have the cosmetic agent 26 applied thereto. These area(s) of the portion 42 will become part of the 3D part 54 that is formed, but will not exhibit the color of the dye. As such, these area(s) do not become part of the colored region 50 of the 3D part 54 that has the dye embedded therein and exhibits the color of the dye. Rather, these area(s) make up a portion of the 3D part 54 that does not exhibit the color of the dye, but rather exhibits the color of the polymeric or polymeric composite build material 16 and/or the color of fusing agent 28. For example, the edges of the portion 42 (e.g., adjacent to portion(s) 44) may have the cosmetic agent 26 and the fusing agent 28 applied thereto (and thus will form an edge, colored region 50 that exhibits the color of the dye), while a center of the portion 42 may have the fusing agent 28 alone applied thereto (and thus will form a center region that does not exhibit the color of the dye).

As such, in some examples of the method 100, 200, the at least the portion 42 of the polymeric or polymeric composite build material 16 is less than all of the polymeric or polymeric composite build material 16; the method further comprises selectively applying the fusing agent 28 on another portion of the polymeric or polymeric composite build material 16; the exposing of the polymeric or polymeric composite build material 16 to electromagnetic radiation 46 fuses the other portion of the polymeric or polymeric composite build material 16 and forms a remaining region 52 of the layer 48; and the remaining region 52 of the layer 48 does not have the dye of the cosmetic agent 26 embedded therein.

In these other examples, the method 100, 200 may include applying the fusing agent 28 on a portion of the polymeric or polymeric build material 16 to which the cosmetic agent 26 is not applied. For example, the cosmetic agent 26 may be applied to a portion of the polymeric or polymeric build material 16 (and thus the portion is less than all of the polymeric or polymeric build material 16), and the fusing agent 28 may be selectively applied on the portion and on another portion of the polymeric or polymeric build material 16. As such, the exposing of the polymeric or polymeric composite build material 16 to electromagnetic radiation 46 fuses the portion and the other portion of the polymeric or polymeric composite build material 16 and forms a layer 48, which includes a remaining region 52. In these examples, a region (i.e., the remaining region 52) that does not exhibit the color of the dye is formed. The region without the dye embedded therein may be an entire layer of the 3D part 54 or may be a remaining region 52 of a layer that also includes a colored region 50 (i.e., part of a layer exhibits the color of the dye and another part of a layer does not). When the region that does not exhibit the color of the dye is the remaining region 52 of a layer 48 that also exhibits the color of the dye, the portion of the polymeric or polymeric composite build material 16 to which the cosmetic agent 26 is applied is less than all of the polymeric or polymeric composite build material 16.

While not shown, in some examples, the method 100, 200 may further include selectively applying another or second cosmetic agent including another or second dye on a portion of the polymeric or polymeric composite build material 16. The other or second cosmetic agent may be used to introduce another or second dye, which may be different than the dye in the cosmetic agent 26, to the layer 40. In this example, the fused layer 48 exhibits another or second color (i.e., the color of the other or second dye), which may be different than or similar to the color imparted by the dye in the cosmetic agent 26.

The other or second cosmetic agent may be applied to the same portion(s) (e.g., portion 42) as, or different portion(s) than, the portion(s) (e.g., portion 42) to which cosmetic agent 26 is applied. For example, if the agents impart different colors that together result in a colored region (e.g., colored region 50) exhibiting a desired color (formed from the combination of the different dyes in the agents), it may be desirable to apply the agents in the same area(s) or portion(s) 42. For another example, if the 3D part 54 is to exhibit different colors in different regions, it may be desirable to apply the agents in different area(s) or portion(s) 42.

The other or second cosmetic agent may be applied to the polymeric or polymeric composite build material 16 with one of the applicators 24A, 24B (from a separate cartridge for dispensing the other or second cosmetic agent) or with a third applicator (not shown) that may be similar to the applicators 24A, 24B.

It is to be understood that a single fusing agent 28 may be selectively applied on the portion 42, or multiple fusing agents 28 may be selectively applied on the portion 42. When multiple fusing agents 28 are utilized, each is capable of absorbing enough electromagnetic radiation 46 so that the polymeric or polymeric composite build material 16 in the patterned portion 42 will fuse.

In some examples of the method 100, 200, prior to forming the layer 48, the method further comprises applying the cosmetic agent 26 on a sacrificial build material layer (not shown). A sacrificial layer may be used to enhance the color of the first layer (e.g., fused layer 48) of the part 54 that is being formed. The sacrificial layer of polymeric or polymeric composite build material particles 16 may be applied in the same manner as the layer 40. The cosmetic agent 26 may be selectively applied to at least a portion of the sacrificial layer of polymeric or polymeric composite build material 16. As such, the build material particles 16 in this portion of the sacrificial layer become colored. The portion of the sacrificial layer to which the cosmetic agent 26 is applied may correspond (i.e., be in the same position in the x-y plane although at a different position on the z-axis) to the portion 42 of the layer 40 to which the cosmetic agent 26 is applied.

In this example, this sacrificial layer is not fused (as no fusing agent 28 is applied thereon). Rather, some of the colored polymeric or polymeric composite build material particles 16 in the sacrificial layer may become embedded in fused build material particles of the part layer (e.g., fused layer 48) that is formed thereon. In other words, some of the colored polymeric or polymeric composite build material 16 may become embedded in the surface of the part layer that is formed adjacent thereto. The unfused, but embedded colored polymeric or polymeric composite build material particles 16 may help to maintain saturation at the surface (of the ultimately formed layer 48) by providing a colored interface between the fused layer 48 and surrounding unfused polymeric or polymeric composite build material particles 16.

It is to be understood that several sacrificial layers may be sequentially formed in contact with one another.

The cosmetic agent 26 may penetrate at least partially into the sacrificial layer. The cosmetic agent 26 may penetrate throughout the entire thickness of the sacrificial layer. This creates a surface upon which a subsequent layer (e.g., layer 40) of polymeric or polymeric composite build material particles 16 may be applied.

When it is desirable to form the colored region(s) 50 along the sides of the part 54 that is being formed, it may also be desirable to selectively deposit the cosmetic agent 26 in portion(s) of the unpatterned polymeric or polymeric composite build material particles 16 which are adjacent to or surround the portion(s) 42 (which when fused, will form the colored region 50 along the sides of the part 54). The colored polymeric or polymeric composite build material particles 16 in the portion(s) of the unpatterned polymeric or polymeric composite build material particles 16 may become embedded in fused build material particles of the colored region 50. The unfused, but embedded colored polymeric or polymeric composite build material particles 16 may help to maintain saturation at the surface (of the colored region 50) by providing a colored interface between the colored region (s) 50 and surrounding unfused polymeric or polymeric composite build material particles 16.

Figure 3D:
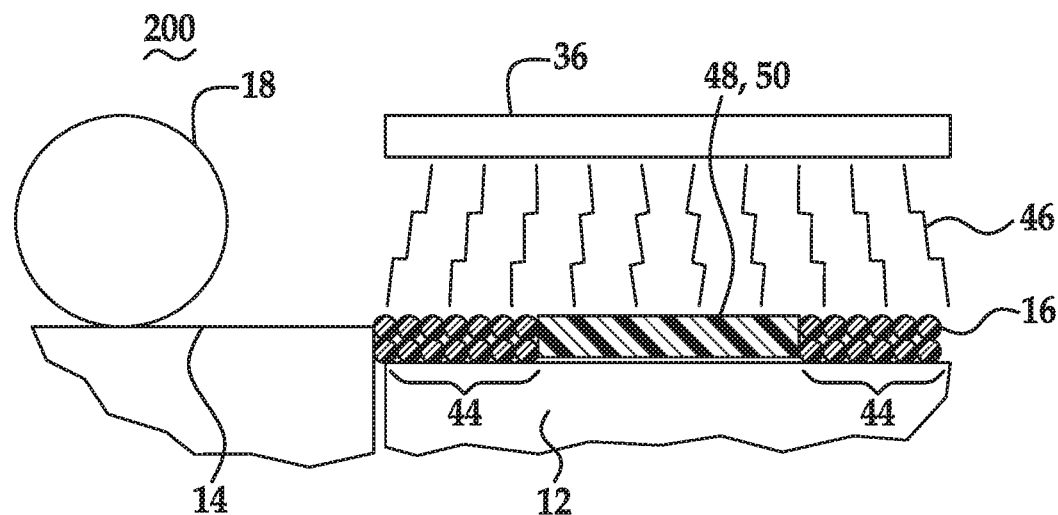

As shown at reference numeral 108 in FIG. 2 and FIGS. 3C and 3D, the method 100, 200 continues by exposing the polymeric or polymeric composite build material 16 to electromagnetic radiation 46 to fuse the at least the portion 42 of the polymeric or polymeric composite build material 16 to form a colored region 50 of a layer 48, the colored region 50 of the layer 48 having the dye of the cosmetic agent 26 embedded therein and maintaining the color of the dye. The electromagnetic radiation 46 may be applied with the source 36 of electromagnetic radiation 46 as shown in FIG. 3D or with the source 36' of electromagnetic radiation 46 as shown in FIG. 3C.

The fusing agent 28 enhances the absorption of the electromagnetic radiation 46, converts the absorbed electromagnetic radiation 46 to thermal energy, and promotes the transfer of the thermal heat to the polymeric or polymeric composite build material particles 16 in contact therewith. In an example, the fusing agent 28 sufficiently elevates the temperature of the polymeric or polymeric composite build material particles 16 in layer 40 above the melting or softening point of the particles 16, allowing fusing (e.g., sintering, binding, curing, etc.) of the polymeric or polymeric composite build material particles 16 to take place. The application of the electromagnetic radiation 46 forms the fused layer 48, as shown in FIG. 3D.

It is to be understood that portions 44 of the polymeric or polymeric composite build material 16 that do not have the fusing agent 28 applied thereto do not absorb enough electromagnetic radiation 46 to fuse. As such, these portions 44 do not become part of the 3D part 54 that is ultimately formed. The polymeric or polymeric composite build material 16 in portions 44 may be reclaimed to be reused as build material in the printing of another 3D part. It is to be understood that it may be desirable to not reuse any polymeric or polymeric composite build material 16 to which the cosmetic agent 26 has been applied.

Figure 3E:
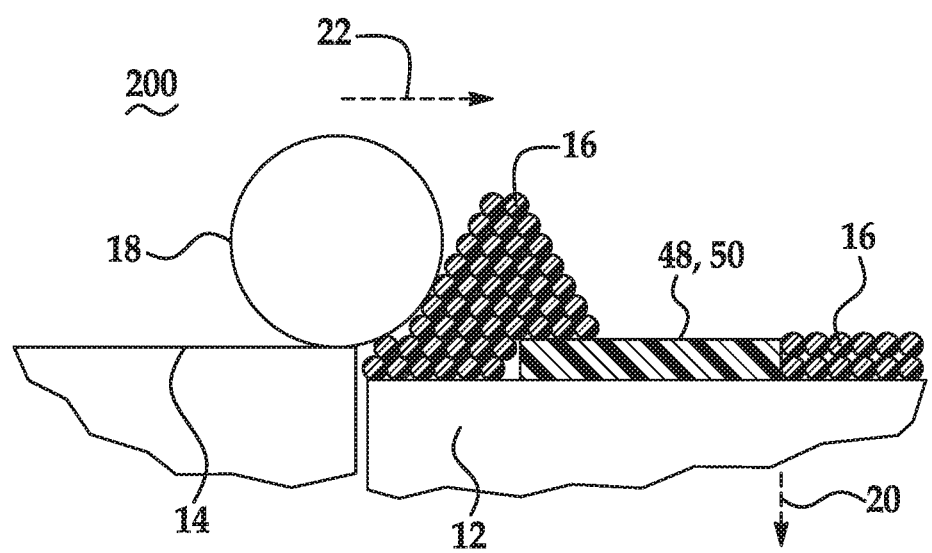

The processes shown in FIG. 2 and FIGS. 3A through 3D may be repeated to iteratively build up several fused layers and to form the 3D printed part 54. FIG. 3E illustrates the initial formation of a second layer of polymeric or polymeric composite build material particles 16 on the previously formed layer 48. In FIG. 3E, following the fusing of the predetermined portion(s) 42 of the layer 40 of polymeric or polymeric composite build material 16, the controller 32 may process data, and in response cause the build area platform 12 to be moved a relatively small distance in the direction denoted by the arrow 20. In other words, the build area platform 12 may be lowered to enable the next layer of polymeric or polymeric composite build material particles 16 to be formed. For example, the build material platform 12 may be lowered a distance that is equivalent to the height of the layer 40. In addition, following the lowering of the build area platform 12, the controller 32 may control the build material supply 14 to supply additional polymeric or polymeric composite build material particles 16 (e.g., through operation of an elevator, an auger, or the like) and the build material distributor 18 to form another layer of polymeric or polymeric composite build material particles 16 on top of the previously formed layer with the additional polymeric or polymeric composite build material 16. The newly formed layer may be in some instances pre-heated, patterned with the cosmetic agent 26, patterned with the fusing agent 28, and then exposed to electromagnetic radiation 46 from the source 36, 36' of electromagnetic radiation 46 to form the additional fused layer.

In some examples of the method 100, 200, the method 100, 200 further comprises applying the cosmetic agent 26 on the colored region 50. The cosmetic agent 26 may be selectively applied to the colored region 50 of a top layer of the 3D part 54. The cosmetic agent 26 applied to the colored region 50 may help to maintain saturation at the surface of the colored region 50 by coloring the build material particles at the surface, whether these particles are fused or unfused and embedded in the fused particles.

Figure 4:
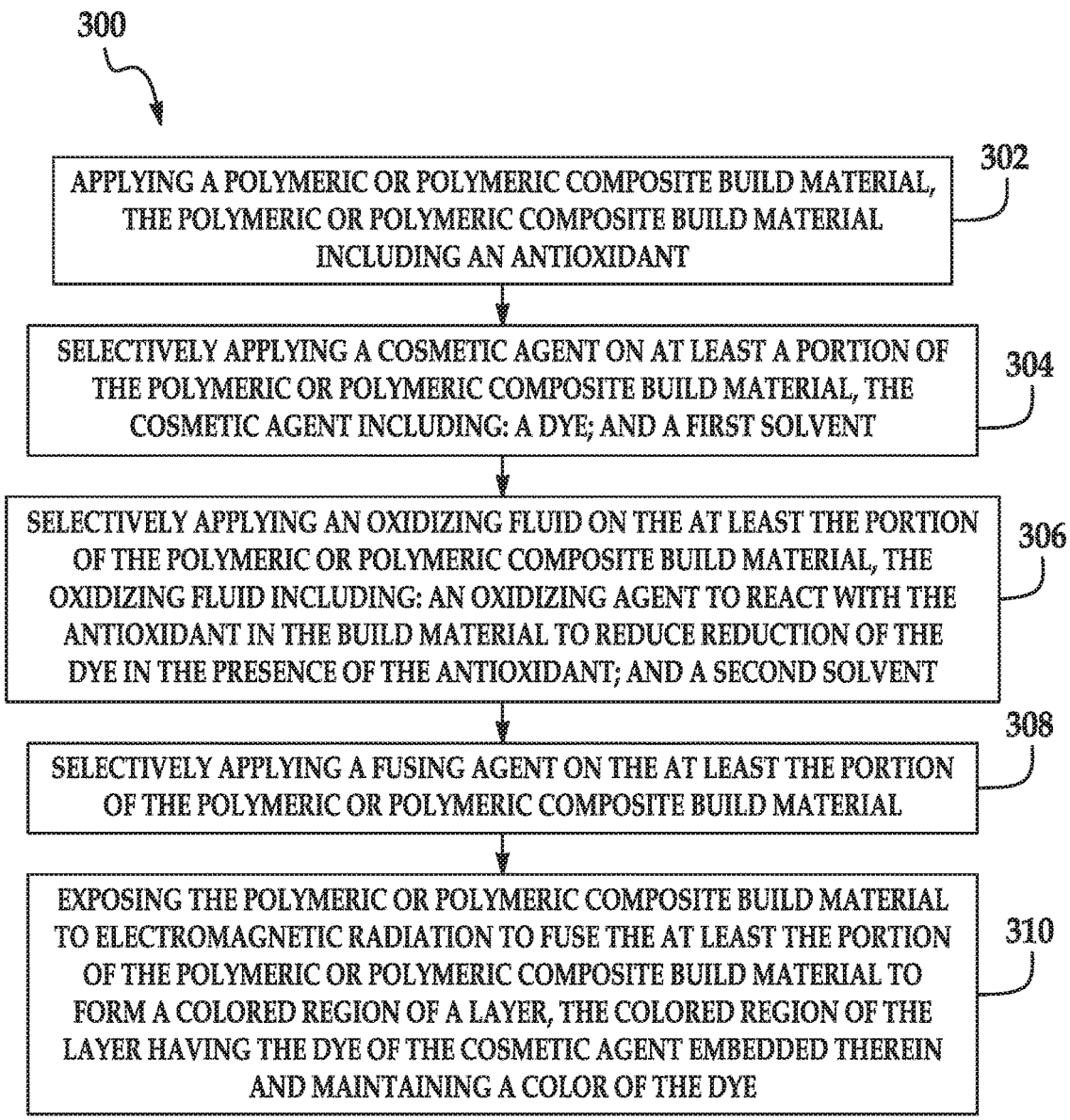
FIG. 4 is a flow diagram illustrating another example of a 3D printing method disclosed herein.

Referring now to FIG. 4, another example of the 3D printing method 300 is depicted. This example of the method 300 uses the cosmetic agent 26 (not having the oxidizing agent therein) and the oxidizing fluid (having the oxidizing agent therein), which together make up the 3D printing composition. It is to be understood that the components of the 3D printing composition (e.g., the cosmetic agent 26 and the oxidizing fluid) may be contained in separate containers or in separate compartments of a single container or in the same container prior to being applied to the build material 16. This method 300 may be used to form 3D printed parts 54 (see, e.g., FIG. 5) with colored region(s) 50.

Prior to execution of the method 300 or as part of the method 300, the controller 32 may access data stored in the data store 34 pertaining to a 3D part that is to be printed. The controller 32 may determine the number of layers of polymeric or polymeric composite build material 16 that are to be formed, the locations at which the cosmetic agent 26 from the first applicator 24A is to be deposited on each of the respective layers, and the locations at which the oxidizing fluid from the third applicator is to be deposited on each of the respective layers the locations at which the fusing agent 28 from the second applicator 24B is to be deposited on each of the respective layers.

One example of the method 300 includes: applying the polymeric or polymeric composite build material 16, the polymeric or polymeric composite build material 16 including the antioxidant (reference numeral 302); selectively applying the cosmetic agent 26 on at least a portion 42 of the polymeric or polymeric composite build material 16, the cosmetic agent 26 including: the dye; and the first solvent (reference numeral 304); selectively applying the oxidizing fluid on the at least the portion 42 of the polymeric or polymeric composite build material 16, the oxidizing fluid including: the oxidizing agent to react with the antioxidant in the build material to reduce reduction of the dye; and the second solvent (reference numeral 306); selectively applying the fusing agent 28 on the at least the portion 42 of the polymeric or polymeric composite build material 16 (reference numeral 308); and exposing the polymeric or polymeric composite build material 16 to electromagnetic radiation 46 to fuse the at least the portion 42 of the polymeric or polymeric composite build material 16 to form the colored region 50 of a layer 48, the colored region 50 of the layer 48 having the dye of the cosmetic agent 26 embedded therein and maintaining the color of the dye (reference numeral 310).

As shown at reference numeral 302, the method 300 includes applying the polymeric or polymeric composite build material 16 (the polymeric or polymeric composite build material 16 including the antioxidant). As previously described, the build material supply 14 may supply the polymeric or polymeric composite build material particles 16 into a position so that they are ready to be spread onto the build area platform 12, and the build material distributor 18 may spread the supplied polymeric or polymeric composite build material particles 16 onto the build area platform 12. The controller 32 may execute control build material supply instructions to control the build material supply 14 to appropriately position the polymeric or polymeric composite build material particles 16, and may execute control spreader instructions to control the build material distributor 18 to spread the supplied polymeric or polymeric composite build material particles 16 over the build area platform 12 to form the layer 40 of polymeric or polymeric composite build material particles 16 thereon.

The layer 40 of the polymeric or polymeric composite build material particles 16 may be exposed to pre-heating in the manner described herein.

As shown at reference numeral 304, the method 300 continues by selectively applying the cosmetic agent 26 on at least a portion 42 of the polymeric or polymeric composite build material 16. As mentioned above, this example of the cosmetic agent 26 may include the dye that exhibits the color and is reducible in the presence of the antioxidant; and the first solvent.

As shown at reference numeral 306, the method 300 continues by selectively applying the oxidizing fluid on the at least a portion 42 of the polymeric or polymeric composite build material 16. As mentioned above, the oxidizing fluid may include the oxidizing agent to react with the antioxidant in the build material to reduce reduction of the dye; and the second solvent.

In an example of the method 300, upon the selectively applying of the oxidizing fluid, the oxidizing agent in the oxidizing fluid reacts with the antioxidant(s) in the at least the portion 42 of the polymeric or polymeric composite build material 16; and after the oxidizing agent reacts with the antioxidant, there is little or no unreacted antioxidant in the at least the portion 42 of the polymeric or polymeric composite build material 16 available to reduce the dye. Thus, the oxidizing agent at least substantially prevents reduction of the dye.

As shown at reference numeral 308, the method 300 also includes selectively applying the fusing agent 28 on the at least the portion 42 of the polymeric or polymeric composite build material 16. As mentioned above, the fusing agent 28 includes the active material and the FA vehicle.

The cosmetic agent 26 may be dispensed from the first applicator 24A, the fusing agent 28 may be dispensed from the second applicator 24B, and the oxidizing fluid may be dispensed from the third or fourth applicator. The cosmetic agent 26, the oxidizing fluid, and the fusing agent 28 may be applied in any order. In an example, the cosmetic agent 26 may be dispensed onto the portion 42 first, then the oxidizing fluid may be dispensed onto the portion 42, and then the fusing agent 28 may be dispensed onto the portion 42. In another example, the fusing agent 28 may be dispensed onto the portion 42 first, then the cosmetic agent 26 may be dispensed onto the portion 42, and then the oxidizing fluid may be dispensed onto the portion 42. In still another example, the oxidizing fluid may be dispensed onto the portion 42 first, then the cosmetic agent 26 may be dispensed onto the portion 42, and then the fusing agent 28 may be dispensed onto the portion 42. In yet another example, the cosmetic agent 26, the oxidizing fluid, and the fusing agent 28 may be dispensed at least substantially simultaneously (e.g., one immediately after the other in a single printing pass, or at the same time). The cosmetic agent 26 may be applied before the oxidizing fluid because the redox reaction that would occur between the dye and the antioxidant(s) occurs slowly enough that the oxidizing fluid will be applied before that reaction occurs.

The first applicator 24A, the second applicator 24B, and the third or fourth applicator may each be a thermal inkjet printhead, a piezoelectric printhead, etc., and each of the selectively applying of the cosmetic agent 26, the selectively applying of the oxidizing fluid, and the selectively applying of the fusing agent 28 may be accomplished by thermal inkjet printing, piezo electric inkjet printing, etc.

The cosmetic agent 26, the oxidizing fluid, and the fusing agent 28 each may be dispensed at an ink flux ranging from about 0.1 ng to about 48 ng per $\frac{1}{600}^{th}$ sq. in. In an example, 3 drops or 27 ng per $\frac{1}{600}^{th}$ sq. in. of each of the cosmetic agent 26 and the oxidizing fluid may be deposited (using a printhead architecture with a 9 ng drop size).

The controller 32 may process data, and in response, control the first applicator 24A to deposit the cosmetic agent 26 in the manner described herein. The controller 32 may also process data, and in response, control the second applicator 24B to deposit the fusing agent 28 in the manner described herein. The controller 32 may also process data, and in response, control the third or fourth applicator to deposit the oxidizing fluid onto predetermined portion(s) 42 of the polymeric or polymeric composite build material 16 to which the cosmetic agent 26 is applied. The oxidizing agent in the oxidizing fluid reacts with the antioxidant(s) in those portion(s) 42 and at least substantially prevents reduction of the dye.

When the oxidizing fluid is selectively applied in the desired area(s) of the portion(s) 42, the oxidizing agent (present in the oxidizing fluid) infiltrates the inter-particles spaces among the polymeric or polymeric composite build material 16. The volume of the oxidizing fluid that is applied per unit of the polymeric or polymeric composite build material 16 in the patterned portion 42 may be sufficient to react with the antioxidant(s) in the patterned portion 42.

In some examples, the previously described other or second cosmetic agent may be applied in the manner described herein.

Some examples of the method 300 include applying the cosmetic agent 26 and the oxidizing fluid on the sacrificial build material layer. The cosmetic agent 26 may be applied to the sacrificial build material layer in the manner described herein, and the oxidizing fluid may be applied to the sacrificial build material layer in a similar manner. The oxidizing fluid may be selectively applied to the same portion of the sacrificial layer to which the cosmetic agent 26 is selectively applied.

When it is desirable to form the colored region(s) 50 along the sides of the part 54 that is being formed, the cosmetic agent 26 and the oxidizing fluid may each be selectively deposited in portion(s) of the unpatterned polymeric or polymeric composite build material particles 16 which are adjacent to or surround the portion(s) 42 (which when fused, will form the colored region 50 along the sides of the part 54).

As shown at reference numeral 310, the method 300 continues by exposing the polymeric or polymeric composite build material 16 to electromagnetic radiation 46 to fuse the at least the portion 42 of the polymeric or polymeric composite build material 16 to form a colored region 50 of a layer 48, the colored region 50 of the layer 48 having the dye of the cosmetic agent 26 embedded therein and maintaining the color of the dye. The electromagnetic radiation 46 may be applied in the manner described herein.

The fusing agent 28 enhances the absorption of the electromagnetic radiation 46, converts the absorbed electromagnetic radiation 46 to thermal energy, and promotes the transfer of the thermal heat to the polymeric or polymeric composite build material particles 16 in contact therewith. In an example, the fusing agent 28 sufficiently elevates the temperature of the polymeric or polymeric composite build material particles 16 in layer 40 above the melting or softening point of the particles 16, allowing fusing (e.g., sintering, binding, curing, etc.) of the polymeric or polymeric composite build material particles 16 to take place.

It is to be understood that portions 44 of the polymeric or polymeric composite build material 16 that do not have the fusing agent 28 applied thereto do not absorb enough electromagnetic radiation 46 to fuse. As such, these portions 44 do not become part of the 3D part 54 that is ultimately formed. The polymeric or polymeric composite build material 16 in portions 44 may be reclaimed to be reused as build material in the printing of another 3D part. It is to be understood that it may be desirable to not reuse any polymeric or polymeric composite build material 16 to which the cosmetic agent 26 and/or the oxidizing fluid has been applied.

In an example of the method 300, the at least the portion 42 of the polymeric or polymeric composite build material 16 is less than all of the polymeric or polymeric composite build material 16; the method further comprises selectively applying the fusing agent 28 on another portion of the polymeric or polymeric composite build material 16; the exposing of the polymeric or polymeric composite build material 16 to electromagnetic radiation 46 fuses the other portion of the polymeric or polymeric composite build material 16 and forms a remaining region 52 of the layer 48; and the remaining region 52 of the layer 48 does not have the dye of the cosmetic agent 26 embedded therein.

The processes shown in FIG. 4 may be repeated to iteratively build up several fused layers and to form the 3D printed part 54.

In some examples of the method 300, the method 300 further includes applying the cosmetic agent 26 and the oxidizing fluid on the colored region 50. For example, the cosmetic agent 26 and the oxidizing fluid may be selectively applied to the colored region 50 of a top layer of the 3D part 54.

Examples of the system 10 and method 100, 200, 300 disclosed herein may be used to form the 3D printed part 54 shown in FIG. 5. As shown in FIG. 5, the 3D printed part 54 may include a plurality of fused layers (e.g., fused layer 48). The fused layers of the 3D printed part 54 include exterior layer(s) 56 and interior layer(s) 58. As used herein, the term "exterior layer" refers to a layer or a portion of a layer that forms part of the outside or shell of the 3D printed part 54. The term "exterior layer" may apply to a thickness of several fused layers so that the exterior layers are thicker than one voxel. As used herein, the term "interior layer" refers to a layer or a portion of a layer that forms part of the inside or core of the 3D printed part 54.

At least some of the fused layers include a colored region 50. The colored region(s) 50 correspond(s) to the region(s) of the layer(s) on which the cosmetic agent 26 is applied during the printing process 100, 200, 300. The colored regions 50 have the dye embedded therein. Thus, the colored regions 50 exhibit the color of the dye. In an example, the exterior layers 56 may be colored regions 50, with the dye embedded therein, and the interior layers 58 may be remaining regions 52, without the dye embedded therein. In this example, the color of the dye will be exhibited at the exterior of the part 54. In another example, the colored region 50, with the dye embedded therein, may be the entire layer of every fused layer. In this example, the entire 3D part 54 exhibits the color of the dye. In still another example, some, but not all, of the exterior layers 56 may be colored regions 50. The exterior layers 56 that will be visible may be colored regions 50. It may not be desirable for a surface of the part 54 that may not be visible when the part 54 is in use to be a colored region 50.

To further illustrate the present disclosure, examples are given herein. It is to be understood that these examples are provided for illustrative purposes and are not to be construed as limiting the scope of the present disclosure.

EXAMPLES

Example 1

An example of the cosmetic agent was prepared. The example cosmetic agent included Direct Black 168 as the dye and potassium nitrate as the oxidizing agent. A comparative agent was also prepared. The comparative agent had the same formulation as the example cosmetic agent except that the comparative agent did not include an oxidizing agent. The general formulations of the example cosmetic agent and the comparative agent are shown in Table 1, with the wt % of each component that was used.

TABLE 1

| Ingredient | Specific component | Example cosmetic agent (wt %) | Comparative agent (wt %) |
| --- | --- | --- | --- |
| Dye | Direct Black 168 | 3.0 | 3.0 |
| Co-solvent | 2-pyrrolidone | 19.0 | 19.0 |
|  | N-(2-Hydroxyethyl)-2-pyrrolidone | 26.0 | 26.0 |
| Surfactant | TERGITOL ™ 15-S-9 | 0.75 | 0.75 |
|  | DOWFAX ™ 8390 | 0.1 | 0.1 |
| Anti-kogation agent | CRODAFOS ® O3A | 0.5 | 0.5 |
| Chelating agent | TRILON ® M | 0.04 | 0.04 |
| Antimicrobial agent | ACTICIDE ® B20 | 0.18 | 0.18 |
|  | ACTICIDE ® M20 | 0.07 | 0.07 |
| Buffer | TRIZMA ® | 0.1 | 0.1 |
| Oxidizing agent | Potassium nitrate | 3.0 | — |
| Solvent | DI (deionized) Water | Balance | Balance |

The example cosmetic agent and the comparative agent were combined (separately) with two example build material powders (i.e., four unique combinations were created, each with one agent and one powder). The first example build material powder included polyamide-12 (PA-12) as the bulk powder, 2 wt % of a whitening material (e.g., $TiO_2$, ZnO, $CaCO_3$), and an antioxidant. The second build material included polyamide-12 (PA-12) as the bulk powder, 3 wt % of a whitening material, and an antioxidant. Three drops of each of the example cosmetic agent and the comparative agent were respectively added to each of the build material powders. In each combination, the agent accounted for 29 wt % of the undensified powder.

Then the combinations were exposed to a temperature of 165° C. for 6 hours. After 6 hours at 165° C., the combinations including the example cosmetic agent maintained the black color of the dye. After 6 hours at 165° C., the combinations including the comparative agent turned brown.

Additionally, different examples of the cosmetic agent of Table 1 were prepared with different concentration of the potassium nitrate. All of the other components were present in the amounts listed in Table 1. The different concentrations of the potassium nitrate included 1 wt %, 2 wt %, 5 wt %, 8 wt %, and 10 wt %. Three drops of the different cosmetic agents were dispensed on separate samples of the example build material.

Each of the samples patterned with the different cosmetic agents (with the difference concentrations of the potassium nitrate) was exposed to a temperature of 165° C. for 6 hours. After 6 hours at 165° C., the build material patterned with the cosmetic agent with 1 wt % potassium nitrate turned slightly brown, but maintained more black color than the combinations including the comparative agent. After 6 hours at 165° C., the build material patterned with the cosmetic agents with 2 wt % potassium nitrate or 5 wt % potassium nitrate maintained the black color of the dye. After 6 hours at 165° C., the build material patterned with the cosmetic agents with 8 wt % potassium nitrate or 10 wt % potassium nitrate turned slightly gray.

Example 2

An example 3D printed part and a comparative 3D printed part were printed. The build material used to print the example and comparative parts was the same build material powder described in Example 1. The fusing agent used to print the example and comparative parts was carbon black based.

The parts were formed layer by layer; where each layer of build material had the fusing agent applied thereto and was exposed to electromagnetic radiation to fuse the layer. As the exterior layers of the example part was printed in this manner, the example cosmetic agent from Example 1 was also printed on the build material using an HP 761 printhead along with the fusing agent. As the exterior layers of the comparative part was printed in this manner, the comparative agent from Example 1 was also printed on the build material using an HP 761 printhead along with the fusing agent. After printing, both the example part and the comparative part were black.

Then the example and comparative parts were exposed to a temperature of 165° C. for 24 hours. After 24 hours at 165° C., the example part maintained the black color of the dye. After 24 hours at 165° C., the comparative part turned brown.

It is to be understood that the ranges provided herein include the stated range and any value or sub-range within the stated range. For example, a range from about 1 wt % to about 5 wt % should be interpreted to include not only the explicitly recited limits of from about 1 wt % to about 5 wt %, but also to include individual values, such as 1.01 wt %, 1.8 wt %, 2.0 wt %, 3.05 wt %, 4.785 wt %, etc., and sub-ranges, such as from about 1.1 wt % to about 4.95 wt %, from about 1.5 wt % to about 3.5 wt %, from about 2.5 wt % to about 4.0 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A cosmetic agent for three-dimensional (3D) printing, comprising:
    a dye;
    an oxidizing agent to react with an antioxidant in a build material to reduce reduction of the dye in the presence of the antioxidant; and
    a solvent.

2. The cosmetic agent as defined in claim 1 wherein the dye is water-soluble.

3. The cosmetic agent as defined in claim 1 wherein the dye is selected from the group consisting of Direct Black 168, Pacified Reactive Black 31, Acid Black 1, Food Black 2, JPD Black H-BKD, and combinations thereof.

4. The cosmetic agent as defined in claim 1 wherein the oxidizing agent is selected from the group consisting of inorganic nitrates, peroxides, persulfates, permanganates, nitric acid, hypochlorites, chlorites, chlorates, perchlorates, sulfuric acid, iodates, and combinations thereof.

5. The cosmetic agent as defined in claim 1 wherein the dye is present in an amount ranging from about 0.5 wt % to about 5 wt % based on a total weight of the cosmetic agent.

6. The cosmetic agent as defined in claim 1 wherein the oxidizing agent is present in an amount ranging from about 0.5 wt % to about 10 wt % based on the total weight of the cosmetic agent.

7. The cosmetic agent as defined in claim 1 wherein the solvent is present in an amount ranging from about 5 wt % to about 70 wt % based on the total weight of the cosmetic agent.

8. The cosmetic agent as defined in claim 1 wherein the cosmetic agent is devoid of a dispersant.

9. The cosmetic agent as defined in claim 1 wherein the cosmetic agent is devoid of a binder.

10. The cosmetic agent as defined in claim 1 wherein:
the dye is a black dye selected from the group consisting of Direct Black 168, Pacified Reactive Black 31, Acid Black 1, Food Black 2, JPD Black H-BKD, and combinations thereof; and
the oxidizing agent is selected from the group consisting of potassium nitrate, benzoyl peroxide, hydrogen peroxide, potassium persulfate, potassium permanganate, nitric acid, sodium hypochlorite, and combinations thereof.

11. A three-dimensional (3D) printing composition, comprising:
a cosmetic agent, comprising:
a dye; and
a first solvent; and
an oxidizing fluid, comprising:
an oxidizing agent to react with an antioxidant in a build material to reduce reduction of the dye in the presence of the antioxidant; and
a second solvent.

12. A method for three-dimensional (3D) printing, comprising:
applying a polymeric or polymeric composite build material, the polymeric or polymeric composite build material including an antioxidant;
selectively applying a cosmetic agent on at least a portion of the polymeric or polymeric composite build material, the cosmetic agent including:
a dye;
an oxidizing agent to react with the antioxidant in the build material to reduce reduction of the dye in the presence of the antioxidant; and
a solvent;
selectively applying a fusing agent on the at least the portion of the polymeric or polymeric composite build material; and
exposing the polymeric or polymeric composite build material to electromagnetic radiation to fuse the at least the portion of the polymeric or polymeric composite build material to form a colored region of a layer, the colored region of the layer having the dye of the cosmetic agent embedded therein and maintaining a color of the dye.

13. The method as defined in claim 12 wherein:
the at least the portion of the polymeric or polymeric composite build material is less than all of the polymeric or polymeric composite build material;
the method further comprises selectively applying the fusing agent on an other portion of the polymeric or polymeric composite build material;
the exposing of the polymeric or polymeric composite build material to electromagnetic radiation fuses the other portion of the polymeric or polymeric composite build material and forms a remaining region of the layer; and
the remaining region of the layer does not have the dye of the cosmetic agent embedded therein.

14. The method as defined in claim 12, further comprising applying the cosmetic agent on the colored region.

15. The method as defined in claim 12 wherein prior to forming the layer, the method further comprises applying the cosmetic agent on a sacrificial build material layer.

* * * * *